United States Patent
Lee et al.

(10) Patent No.: US 10,278,207 B2
(45) Date of Patent: Apr. 30, 2019

(54) METHOD FOR TRANSMITTING/RECEIVING D2D SIGNAL IN WIRELESS COMMUNICATION SYSTEM AND APPARATUS THEREFOR

(71) Applicant: LG ELECTRONICS INC., Seoul (KR)

(72) Inventors: Seungmin Lee, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/517,919

(22) PCT Filed: Oct. 21, 2015

(86) PCT No.: PCT/KR2015/011157
§ 371 (c)(1),
(2) Date: Apr. 7, 2017

(87) PCT Pub. No.: WO2016/064194
PCT Pub. Date: Apr. 28, 2016

(65) Prior Publication Data
US 2017/0311344 A1    Oct. 26, 2017

Related U.S. Application Data

(60) Provisional application No. 62/066,890, filed on Oct. 21, 2014, provisional application No. 62/076,468, (Continued)

(51) Int. Cl.
*H04W 72/12* (2009.01)
*H04W 56/00* (2009.01)
(Continued)

(52) U.S. Cl.
CPC ....... *H04W 72/1289* (2013.01); *H04L 1/0025* (2013.01); *H04L 1/1812* (2013.01);
(Continued)

(58) Field of Classification Search
CPC ... H04L 1/0025; H04L 1/1812; H04L 5/0007; H04L 27/3836; H04W 28/06; H04W 74/0833; H04W 72/1289
See application file for complete search history.

(56) References Cited

U.S. PATENT DOCUMENTS

2010/0002590 A1  1/2010 Park et al.
2011/0237231 A1  9/2011 Horneman et al.
(Continued)

FOREIGN PATENT DOCUMENTS

WO  2014113537  7/2014
WO  2015136040  9/2015

OTHER PUBLICATIONS

PCT International Application No. PCT/KR2015/011157, Written Opinion of the International Searching Authority dated Apr. 6, 2016, 18 pages.

(Continued)

*Primary Examiner* — Benjamin H Elliott, IV
(74) *Attorney, Agent, or Firm* — Lee, Hong, Degerman, Kang & Waimey

(57) ABSTRACT

The present invention relates to a method and apparatus for monitoring a downlink control channel by a first terminal having a single RX chain in a wireless communication system. Specifically, the present invention comprises the steps of: setting a particular gap for a resource area related to device-to-device (D2D) signal transmission/reception; and monitoring a wide area network (WAN) communication-based downlink control channel on the basis of a timer performed according to a discontinuous reception (DRX)

(Continued)

operation, wherein the timer is counted on the basis of at least one subframe which does not overlap with the particular gap, and the particular gap is a time interval set for allowing the single RX chain to cover a switching operation between WMN communication and D2D communication.

4 Claims, 14 Drawing Sheets

Related U.S. Application Data filed on Nov. 6, 2014, provisional application No. 62/077,888, filed on Nov. 10, 2014, provisional application No. 62/080,253, filed on Nov. 14, 2014, provisional application No. 62/086,175, filed on Dec. 1, 2014, provisional application No. 62/146,177, filed on Apr. 10, 2015, provisional application No. 62/150,869, filed on Apr. 22, 2015, provisional application No. 62/161,853, filed on May 14, 2015.

(51) Int. Cl.

| | | |
|---|---|---|
| *H04W 74/08* | (2009.01) | |
| *H04L 1/00* | (2006.01) | |
| *H04L 1/18* | (2006.01) | |
| *H04L 5/00* | (2006.01) | |
| *H04L 27/38* | (2006.01) | |
| *H04W 28/06* | (2009.01) | |

(52) U.S. Cl.
CPC ........ *H04L 5/0007* (2013.01); *H04L 27/3836* (2013.01); *H04W 28/06* (2013.01); *H04W 56/00* (2013.01); *H04W 72/12* (2013.01); *H04W 74/08* (2013.01); *H04W 74/0833* (2013.01)

(56) References Cited

U.S. PATENT DOCUMENTS

| | | | |
|---|---|---|---|
| 2011/0268004 | A1 | 11/2011 | Doppler et al. |
| 2013/0322413 | A1 | 12/2013 | Pelletier et al. |
| 2016/0044652 | A1* | 2/2016 | Xue .................... H04W 56/001 370/329 |
| 2016/0205717 | A1* | 7/2016 | Kazmi ................. H04W 8/005 455/435.2 |
| 2016/0295620 | A1* | 10/2016 | Lindoff ................ H04W 76/14 |
| 2017/0041773 | A1* | 2/2017 | Fujishiro .............. H04W 76/14 |
| 2017/0311344 | A1* | 10/2017 | Lee .................. H04W 72/1289 |

OTHER PUBLICATIONS

Qualcomm Incorporated, "Signal Design for D2D Broadcast Communication", R1-140465, 3GPP TSG RAN WG1 Meeting #76, Feb. 2014, 4 pages.

European Patent Office Application Serial No. 15852302.7, Search Report dated May 2, 2018, 17 pages.

* cited by examiner

FIG. 2
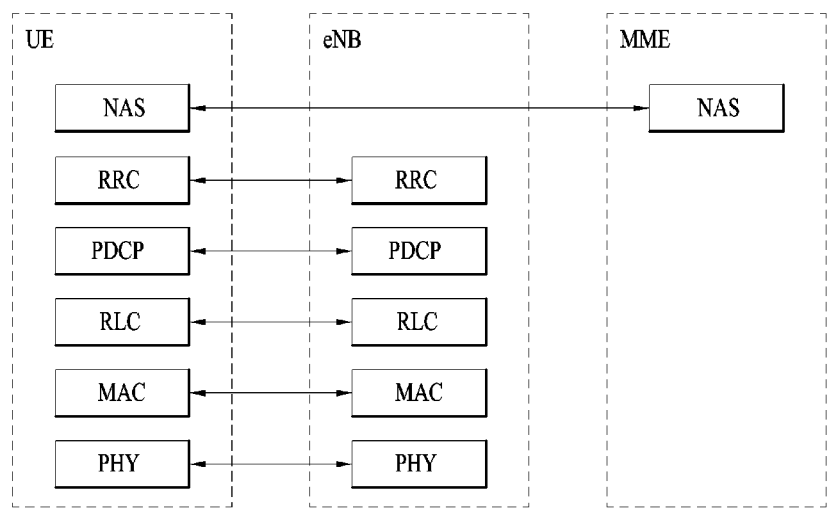
(a) Control-Plane Protocol Stack
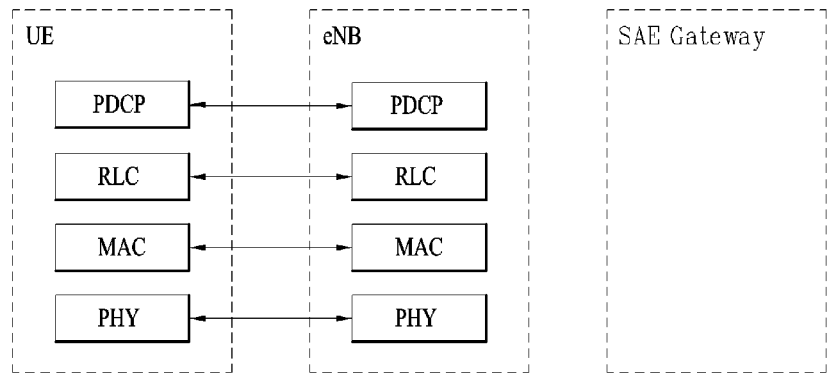
(b) User-Plane Protocol Stack FIG. 8
(a) 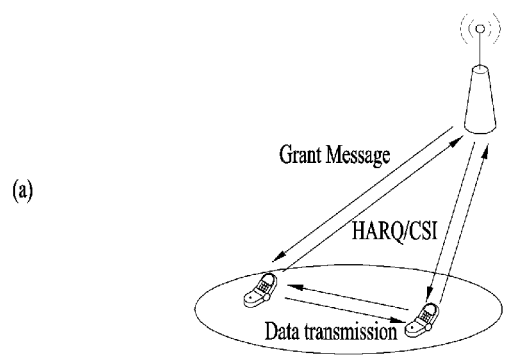
(b) 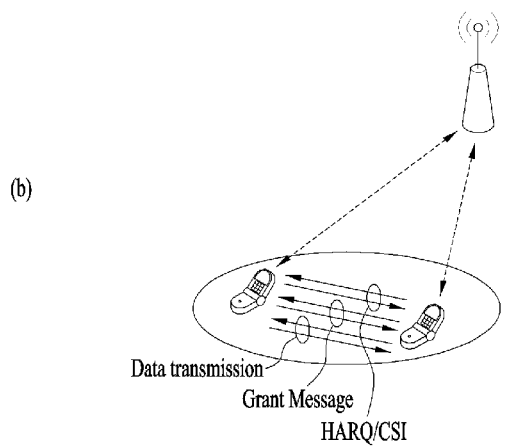

FIG. 13
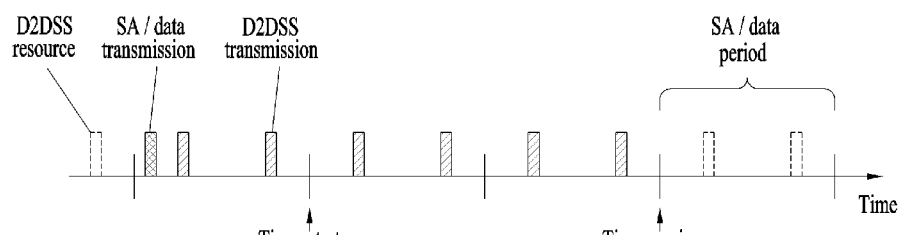
Option 1-1 based on D2DSS transmission timer
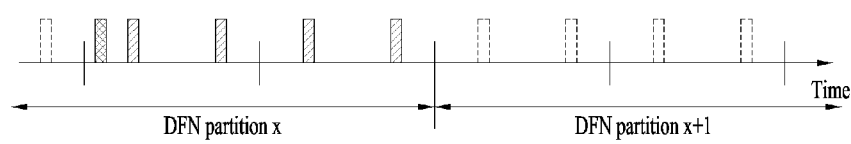
Option 1-2 based on DFN range partitioning
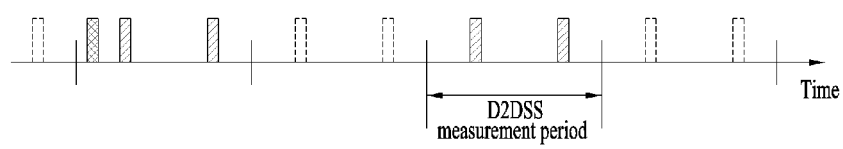
Option 1-3 based on D2DSS measurement period

METHOD FOR TRANSMITTING/RECEIVING D2D SIGNAL IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2015/011157, filed on Oct. 21, 2015, which claims the benefit of U.S. Provisional Application No. 62/066,890, filed on Oct. 21, 2014, 62/076,468, filed on Nov. 6, 2014, 62/077,888, filed on Nov. 10, 2014, 62/080,253, filed on Nov. 14, 2014, 62/086,175, filed on Dec. 1, 2014, 62/146,177, filed on Apr. 10, 2015, 62/150,869, filed on Apr. 22, 2015 and 62/161,853, filed on May 14, 2015, the contents of which are all hereby incorporated by reference herein in their entirety.

TECHNICAL FIELD

The present invention relates to a wireless communication system, and more particularly, to a method for transmitting/receiving a D2D signal in a wireless communication system and an apparatus therefor.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

DISCLOSURE

Technical Problem

Based on the above discussion, a method for transmitting/receiving a D2D signal in a wireless communication system and an apparatus therefor are proposed.

Objects of the present invention are not limited to the aforementioned objects, and other objects of the present invention which are not mentioned above will become apparent to those having ordinary skill in the art upon examination of the following description.

Technical Solution

The object of the present invention can be achieved by providing a method for monitoring a downlink control channel by a first UE having a single RX chain in a wireless communication system, the method including configuring a specific gap for a resource region related to transmission and reception of a Device-to-Device (D2D) signal, and monitoring a Wide Area Network (WAN) communication-based downlink control channel based on a timer operated according to a discontinuous reception (DRX) operation, wherein the timer is counted based on at least one subframe that does not overlap the specific gap, wherein the specific gap is a time interval configured for the single RX chain to cover switching between WAN communication and D2D communication.

When the first UE supports carrier aggregation and WAN communication is enabled in at least one of a first cell and a second cell according to the carrier aggregation, the timer may be configured to be counted including the specific gap.

In another aspect of the present invention, provided herein is a first terminal for monitoring a downlink control channel having a single RX chain in a wireless communication system, including a radio frequency unit, and a processor, wherein the processor is configured to configure a specific gap for a resource region related to transmission and to monitor a Wide Area Network (WAN) communication-based downlink control channel based on a timer operated according to a discontinuous reception (DRX) operation, wherein the timer is counted based on at least one subframe that does not overlap the specific gap, wherein the specific gap is a time interval configured to cover switching between WAN communication and D2D communication.

In another aspect of the present invention, provided herein is a method for performing a random access procedure by a first UE having a single RX chain in a wireless communication system, the method including configuring a random access response window for performing a Wide region Network (WAN) based random access procedure, and configuring a resource region related to transmission and reception of a Device-to-Device (D2D) signal and a specific gap for the resource region, wherein the specific gap is a time interval configured for the single RX chain to cover switching between WAN communication and D2D communication, wherein the resource region and the specific gap are configured only when the random access response window does not overlap the resource region and the specific gap.

Advantageous Effects

According to an embodiment of the present invention, D2D signal transmission/reception may be efficiently performed in a wireless communication system.

It will be appreciated by persons skilled in the art that that the effects that can be achieved through the present invention are not limited to what has been particularly described above and other advantages of the present invention will be more clearly understood from the following detailed description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 is a diagram illustrating structures of a control plane and a user plane of a radio interface protocol between a user equipment and an E-UTRAN based on the 3GPP radio access network standard;

FIG. 8 is a reference diagram illustrating D2D communication;

FIG. 13 is a reference diagram illustrating options related to the present invention;

MODE FOR INVENTION

Figure 1:
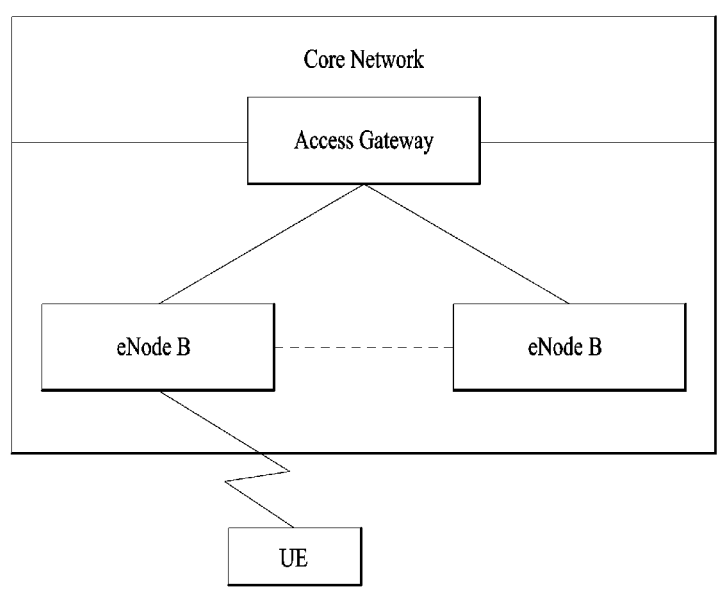
FIG. 1 is a diagram schematically illustrating a network structure of an E-UMTS as an example of a wireless communication system.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

FIG. 2 is a diagram illustrating structures of a control plane and a user plane of a radio interface protocol between a user equipment and an E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
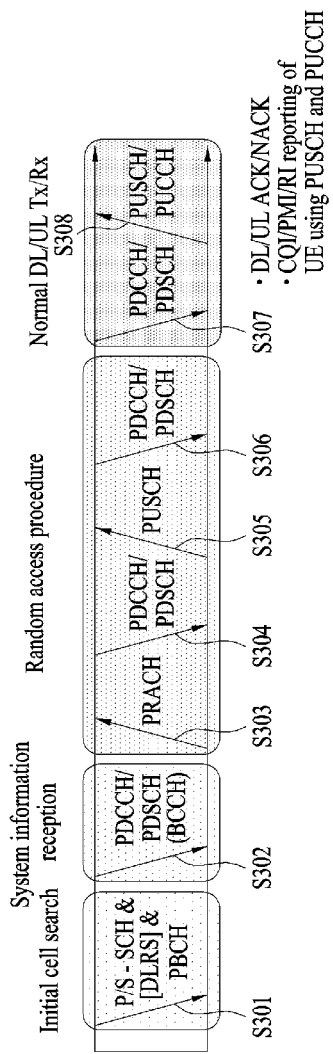
FIG. 3 is a diagram illustrating physical channels used in a 3GPP system and a general method for transmitting a signal using the physical channels.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
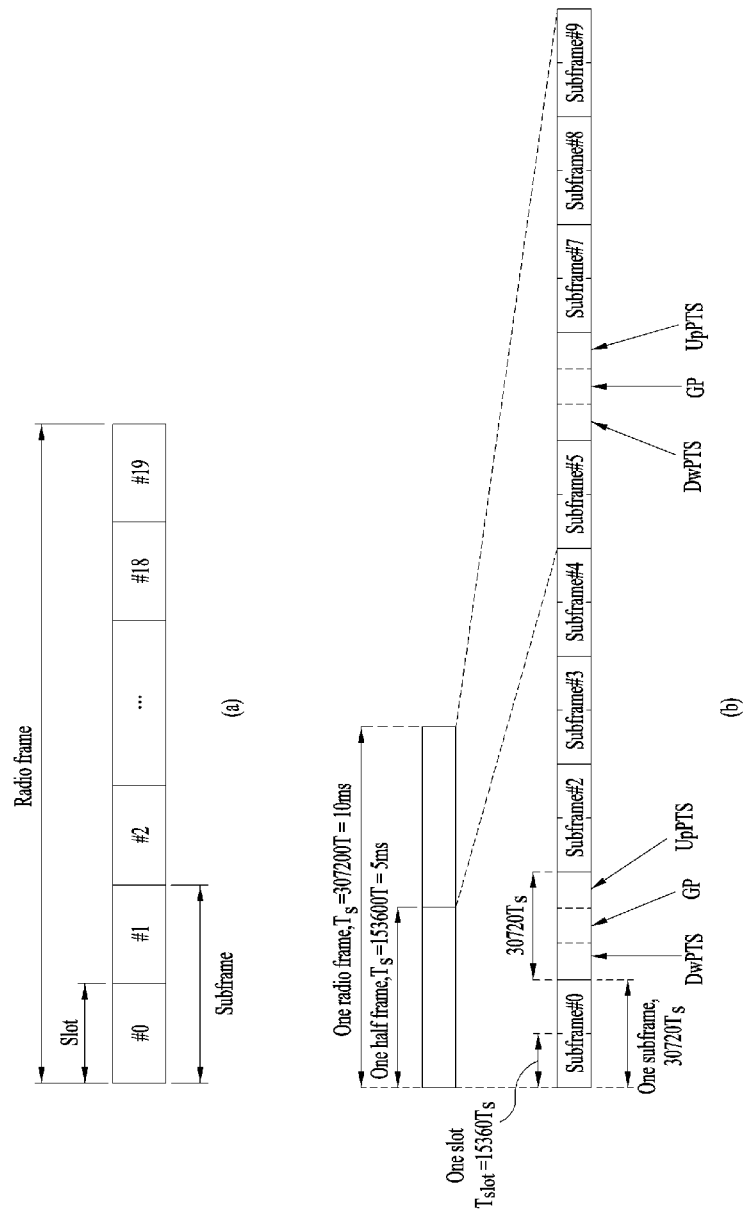
FIG. 4 is a diagram illustrating the structure of a radio frame used in an LTE system.

FIG. 4 is a diagram illustrating the structure of a radio frame used in an LTE system.

Referring to FIG. 4, in a cellular OFDM radio packet communication system, uplink/downlink data packet transmission is performed in units of subframes, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in the time domain and a plurality of resource blocks (RB) in the frequency domain. Since the 3GPP LTE system uses OFDM on downlink, OFDM symbols represent one symbol interval. The OFDM symbol may be referred to as an SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, a maximum of first three OFDM symbols of each subframe may be allocated to a physical downlink control channel (PDCCH), and the other OFDM symbols may be allocated to a physical downlink shared channel (PDSCH).

FIG. 4(b) illustrates the structure of a type-2 radio frame. The type-2 radio frame includes two half frames, each of which has 4 normal subframes including 2 slots and a special subframe including a Downlink Pilot Time Slot (DwPTS), a Guard Period (GP), and an Uplink Pilot Time Slot (UpPTS).

In the special subframe, the DwPTS is used for initial cell search, synchronization, or channel estimation on a UE. The UpPTS is used for channel estimation and acquisition of uplink transmission synchronization for a UE in an eNB. That is, the DwPTS is used for downlink transmission, and the UpPTS is used for uplink transmission. In particular, the UpPTS is utilized for a PRACH preamble or SRS transmission. In addition, the GP is a period between uplink and downlink, which is intended to eliminate uplink interference caused by multipath delay of a downlink signal.

The current 3GPP standard document defines configuration of the special subframe as shown in Table 1 below. Table 1 shows DwPTS and UpPTS given when $T_s=1/(15000 \times 2048)$, and the other region is configured as a GP.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | | — |
| 9 | $13168 \cdot T_s$ | | | — | | — |

In the TDD system, the structures of the type-2 radio subframe, namely uplink/downlink subframe configurations (UL/DL configurations), are given as shown in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 2, D denotes a downlink subframe, U denotes an uplink subframe, and S denotes the special subframe. Table 2 also shows downlink-to-uplink switch-point periodicity in uplink/downlink subframe configuration of each system.

The illustrated radio frame structures are merely illustrative, and various modifications may be made to the number of subframes included in a radio frame, the number of slots included in a subframe, or the number of symbols included in a slot.

Figure 5:
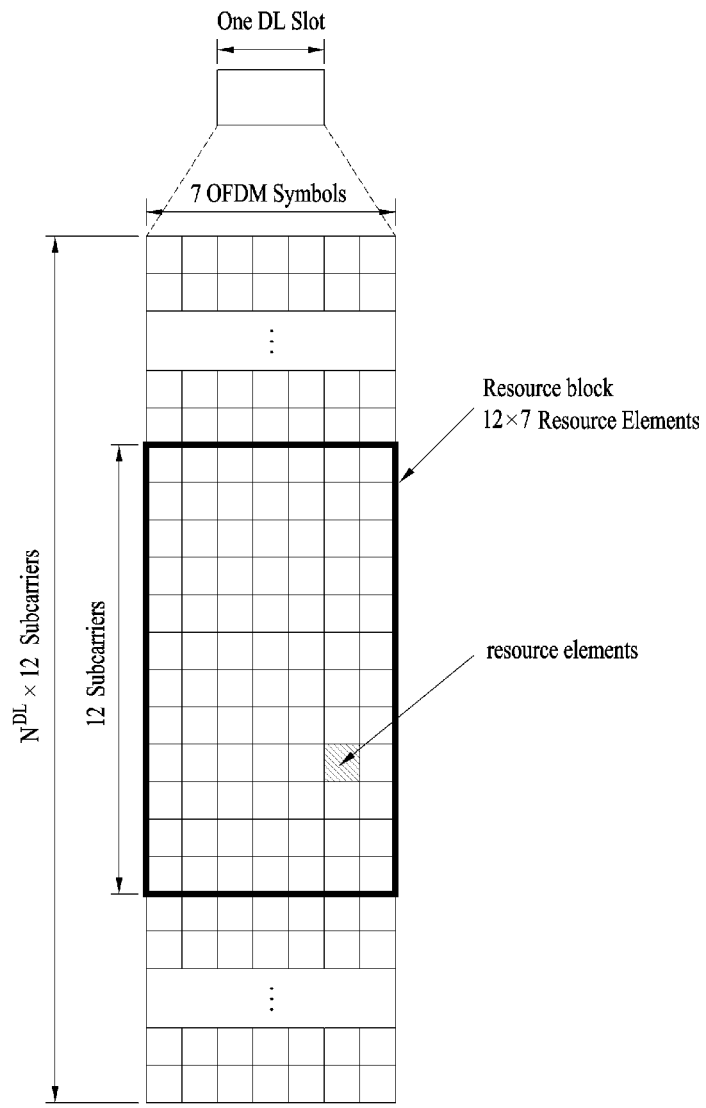
FIG. 5 is a diagram illustrating a resource grid of a downlink slot.

FIG. 5 is a diagram illustrating a resource grid of a downlink slot.

Referring to FIG. 5, the downlink slot includes a plurality of $N_{symb}^{DL}$ OFDM symbols in a time domain and a plurality of $N_{RB}^{DL}$ resource blocks in a frequency domain. subcarriers each resource block includes $N_{RB}^{DL}$ subcarriers, the downlink slot includes $N_{RB}^{DL} \times N_{sc}^{RB}$ subcarriers in the frequency domain. Although FIG. 5 illustrates that the downlink slot includes seven OFDM symbols and the resource block includes twelve subcarriers, it is to be understood that the downlink slot and the resource block are not limited to the example of FIG. 5. For example, the number of OFDM symbols included in the downlink slot may be varied depending on the length of the CP.

Each element on the resource grid will be referred to as a resource element (RE). One resource element is indicated by one OFDM symbol index and one subcarrier index. One RB includes $N_{symb}^{DL} \times N_{sc}^{RB}$ number of resource elements. The number $N_{RB}^{DL}$ of resource blocks included in the downlink slot depends on a downlink transmission bandwidth configured in the cell.

Figure 6:
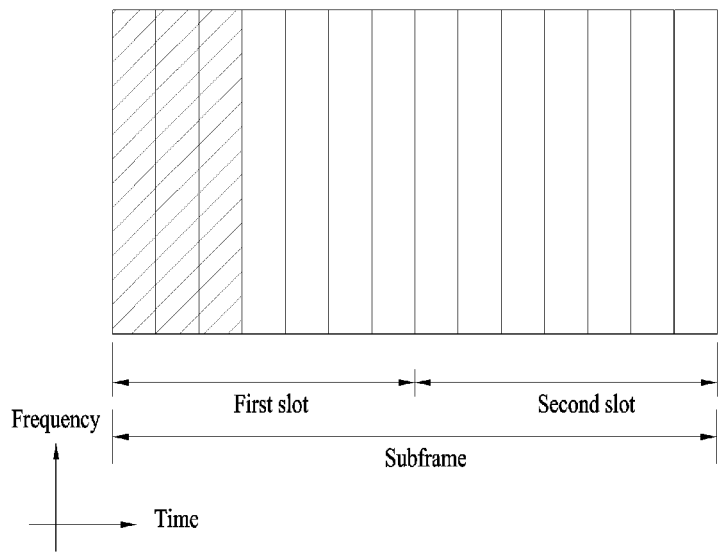
FIG. 6 is a diagram illustrating a structure of a downlink subframe.

FIG. 6 is a diagram illustrating a structure of a downlink subframe.

Referring to FIG. 6, a maximum of three (four) OFDM symbols located at the front of the first slot of the subframe correspond to a control region to which a control channel is allocated. The other OFDM symbols correspond to a data region to which a physical downlink shared channel (PDSCH) is allocated. Examples of downlink control channels used in the LTE system include a Physical Control Format Indicator Channel (PCFICH), a Physical Downlink Control Channel (PDCCH), and a Physical Hybrid ARQ Indicator Channel (PHICH). The PCFICH is transmitted from the first OFDM symbol of the subframe, and carries information on the number of OFDM symbols used for transmission of the control channel within the subframe. The PHICH carries HARQ ACK/NACK (hybrid automatic repeat request acknowledgement/negative-acknowledgement) signals in response to uplink transmission.

The control information transmitted through the PDCCH will be referred to as downlink control information (DCI). The DCI includes resource allocation information for a user equipment or user equipment group. For example, the DCI includes uplink/downlink scheduling information, an uplink transmission (Tx) power control command, etc.

The PDCCH may include transport format and resource allocation information of a downlink shared channel (DL-SCH), transport format and resource allocation information of an uplink shared channel (UL-SCH), paging information on a paging channel (PCH), system information on the DL-SCH, resource allocation information of an upper layer control message such as a random access response transmitted on the PDSCH, a set of transmission (Tx) power control commands of individual user equipment (UEs) within a random user equipment group, transmission (Tx) power control command, and activity indication information of voice over Internet protocol (VoIP). A plurality of PDCCHs may be transmitted within the control region. The user equipment may monitor the plurality of PDCCHs. The PDCCH is transmitted on an aggregate of one or a plurality of continuous control channel elements (CCEs). The CCE is a logic allocation unit used to provide the PDCCH with a coding rate based on the status of a radio channel. The CCE corresponds to a plurality of resource element groups (REGs). The format of the PDCCH and the number of available bits of the PDCCH are determined depending on the number of CCEs. The base station determines a PDCCH format depending on the DCI which will be transmitted to the user equipment, and attaches a cyclic redundancy check (CRC) to the control information. The CRC is masked with an identifier (for example, a radio network temporary identifier (RNTI)) depending on usage of the PDCCH or owner of the PDCCH. For example, if the PDCCH is for a specific user equipment, the CRC may be masked with cell-RNTI (C-RNTI) of the corresponding user equipment. If the PDCCH is for a paging message, the CRC may be masked with a paging identifier (for example, paging-RNTI (P-RNTI)). If the PDCCH is for system information (in more detail, a system information block (SIB)), the CRC may be masked with system information RNTI (SI-RNTI). If the PDCCH is for a random access response, the CRC may be masked with a random access RNTI (RA-RNTI).

Figure 7:
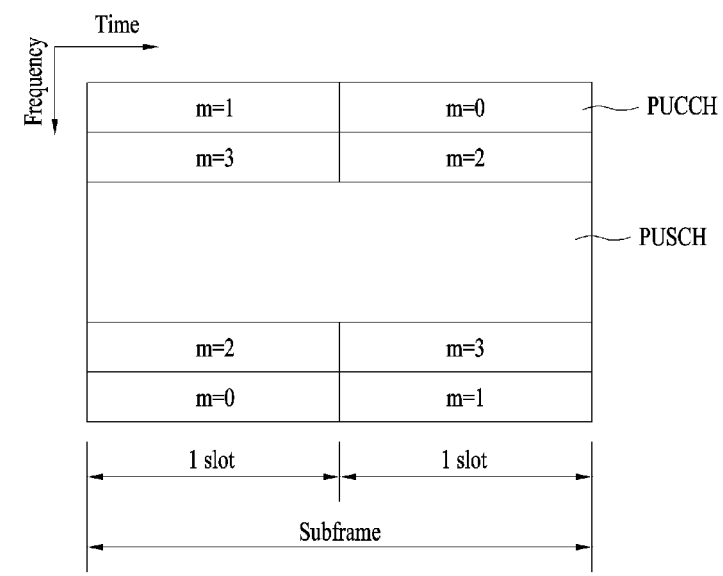
FIG. 7 illustrates the structure of an uplink subframe.

FIG. 7 illustrates the structure of an uplink subframe used in LTE.

Referring to FIG. 7, an uplink (UL) subframe includes a plurality of (e.g., 2) slots. Each slot includes a different number of SC-FDMA symbols according to CP length. The UL subframe is divided into a data region and a control unit in the frequency domain. The data region includes a PUSCH and is used to transmit data signals such as voice. The control region includes a PUCCH and is used to transmit uplink control information (UCI). The PUCCH performs hopping across a slot boundary including an RB pair located at both ends of the data region in the frequency domain.

The PUCCH may be used to transmit control information described below.

Scheduling Request (SR): This is information used to request an uplink UL-SCH resource. This information is transmitted using an On-Off Keying (OOK) scheme.

HARQ ACK/NACK: This is a response signal for a downlink data packet on the PDSCH. This indicates whether a downlink data packet has been successfully received. As a response to a single downlink codeword, 1-bit ACK/NACK is transmitted. As a response to two downlink codewords, 2-bit ACK/NACK is transmitted.

Channel State Information (CSI): This is feedback information about a downlink channel. The CSI includes a channel quality indicator (CQI), and feedback information related to Multiple Input Multiple Output (MIMO) includes a rank indicator (RIA), a precoding matrix indicator (PMI), and a precoding type indicator (PTI). This information uses 20 bits per subframe.

The amount of UCI transmittable by a UE in a subframe depends on the number of SC-FDMAs available for transmission of the UCI. The SC-FDMAs available for transmission of the UCI refer to SC-FDMA symbols other than SC-FDMA symbols for transmission of a reference signal in a subframe. For a subframe in which a sounding reference signal (SRS) is configured, the last SC-FDMA symbol of the subframe is also excluded from the available symbols. The reference signal is used for coherent detection of the PUCCH.

Hereinafter, UE-to-UE communication (D2D communication) will be described.

The D2D communication scheme can be broadly divided into a scheme involving assistance from a network/coordination station (for example, an eNB) and a scheme not involving the assistance.

Referring to FIG. 8, FIG. 8(a) illustrates a scheme in which a network/coordination station is involved in transmission/reception of a control signal (e.g., grant message), HARQ, channel state information, etc., and only data transmission/reception is performed between UEs performing D2D communication. FIG. 8(b) illustrates a scheme in which the network provides only minimum information (for example, D2D connection information available in a corresponding cell), but UEs performing D2D communication form a link and perform data transmission/reception.

Based on the above description, the present invention provides a method for efficiently configuring D2D synchronization signal (D2DSS) (transmission/reception) resources and D2DSS transmission conditions in an environment in which D2D (Device-to-Device) communication is performed will be described.

Herein, D2D communication means that a UE communicates directly with another UE using a radio channel. Generally, a UE refers to a terminal of a user, but network equipment such as an eNB may also be regarded as a kind of UE when it transmits/receives a signal according to the communication scheme between UEs. WAN DL communication may refer to various conventional communications such as (E)PDCCH, PDSCH, CRS and CSI-RS transmitted by the eNB to the UE, or WAN communication may refer to various conventional communication methods such as PRACH, PUSCH, PUCCH transmitted by the UE to the eNB.

Although the present invention is described below based on a 3GPP LTE system for simplicity, the systems to which the present invention is applied may include systems other than the 3GPP LTE system.

Hereinafter, for simplicity, a UE performing a D2D signal transmission operation is defined as a "D2D TX UE", and a UE performing a D2D signal reception operation is defined as a "D2D RX UE."

Embodiments of the present invention may also be applied to i) a case where some D2D UEs participating in D2D communication are within the coverage of a network and the remaining D2D UEs are outside the coverage of the network (D2D Discovery/Communication of Partial Network Coverage), and/or ii) a case where all the D2D UEs participating in D2D communication are within the coverage of the network (D2D Discovery/Communication Within Network Coverage), and/or iii) a case where all D2D UEs participating in D2D communication are outside the coverage of the network (Discovery/Communication Outside Network Coverage (for Public Safety Only)).

Hereinafter, resource configuration/allocation in performing D2D communication will be described first, and then a detailed description of the present invention will be given.

Generally, when a UE communicates directly with another UE using a radio channel, a Resource Unit (RU) corresponding to a specific resource is selected in a resource pool, which means a set of resources, and the corresponding RU is used to transmit the D2D signal (i.e., the operation of the D2D TX UE). The D2D RX UE receives signaling of the information on the resource pool in which the D2D TX UE may transmit a signal, and detects the signal of the D2D TX UE in the corresponding resource pool. Here, the resource pool information may i) be signaled by an eNB when the D2D TX UE is within connection range of the eNB, or ii) may be signaled by another UE or be determined as a predetermined resource if the UE is outside the connection range of the eNB.

Generally, a resource pool includes a plurality of RUs, and each UE may select one or more RUs and use the same to transmit a D2D signal.

Figure 9:
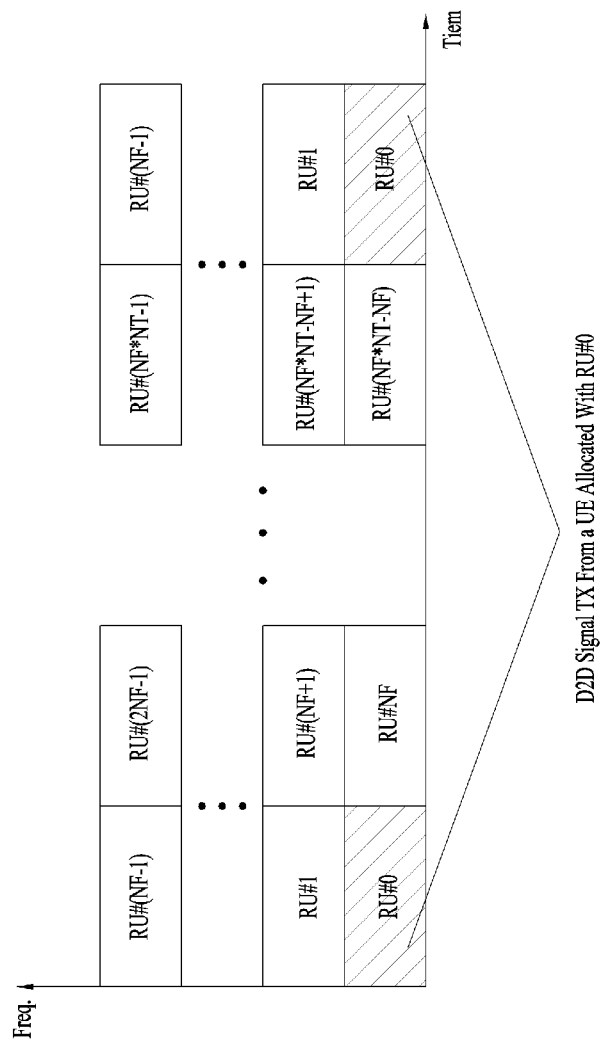
FIG. 9 is a reference diagram illustrating an example of configuration of a resource unit (RU) for D2D communication.

FIG. 9 is a reference diagram illustrating an example of configuration of a resource unit (RU) for D2D communication. This example corresponds to a case where all frequency resources are divided into NF elements and all time resources are divided into NT elements to define NF*NT RUs. Here, the corresponding resource pool may be repeated at intervals of NT subframes). Specifically, one RU may be repeated periodically as shown in FIG. 9. Alternatively, in order to obtain a diversity effect in the time or frequency dimension, the index of a physical RU to which one logical RU is mapped may change in a predetermined pattern over time. In this RU structure, the resource pool may be a set of RUs that a UE desiring to transmit a D2D signal may use for the transmission operation.

The resource pools described above may be subdivided into several types. First, the resource pools may be divided according to the contents of the D2D signal transmitted in the resource pools. The content of a D2D signal may be divided as follows, and a separate resource pool may be configured for each content item.

Scheduling Assignment (SA): This represents a signal containing information such as positions of resources used by each D2D TX UE for transmission of a subsequent D2D data channel, a modulation and coding scheme (MCS) necessary for demodulation of other data channels, or a MIMO transmission scheme. Such a signal may be multiplexed and transmitted with D2D data in the same RU. In this case, the SA resource pool may represent a resource pool in which the SA is multiplexed and transmitted with D2D data. For simplicity, the SA resource pool will be referred to as an "SA pool" in the description below.

D2D data channel: This represents a resource pool used by the D2D TX UE for transmission of user data by utilizing resources designated through the SA. If the D2D data channel is allowed to be multiplexed and transmitted with D2D resource data in the same RU, only the D2D data channel without the SA information may be transmitted in a resource pool for the D2D data channel. In other words, resource elements (REs) for transmitting the SA information in each individual RU in the SA resource pool are used to transmit D2D data in the resource pool for the D2D data channel. For simplicity, these REs will be referred to as a "data pool" in the description below.

Discovery message: This represents a resource pool for a message through which the D2D TX UE transmits information such as an ID thereof to allow neighbor UEs to discover the D2D TX UE. For simplicity, the discovery message will be referred to as a "discovery pool" in the description below.

Even if D2D signals have the same content as described above, different resource pools may be used according to the transmission/reception properties of the D2D signals. For instance, even if the same D2D data channel or DS message is used, different resource pools may be used according to i) a scheme for determining transmission timing of the D2D signal (e.g., the D2D signal is transmitted at a reception time of a synchronization reference signal or at a time obtained by applying timing advance (TA) to the reception time), ii) a resource allocation scheme (e.g., a cell designates a resource for transmitting each individual signal for each individual D2D TX UE or each individual D2D TX UE autonomously selects a resource for transmitting each individual signal from a pool), or iii) a signal format (e.g., the number of symbols occupied by each D2D signal in one subframe or the number of subframes used for transmission of one D2D signal).

The resource allocation method for D2D data channel transmission may be divided into the following two modes.

Mode 1: This mode means a method in which a cell directly designates resources used for SA and D2D data transmission to individual D2D TX UEs. In this mode, the cell may correctly recognize a UE which transmits a D2D signal and resources that the UE will use to transmit the signal. However, designating a D2D resource for each D2D signal transmission may cause excessive signaling overhead. Accordingly, the cell may allocate a plurality of SA and/or data transmission resources through one-time signaling.

Mode 2: This mode means a method in which an individual D2D TX UE selects an appropriate resource from a contiguous SA and a data-related resource pool configured for a plurality of D2D TX UEs by a cell and transmits the SA and/or data. In this case, the cell may not correctly identify a UE to perform D2D transmission and a resource to be used for D2D transmission.

In addition, the resource allocation method for transmitting the discovery message may be classified into the following two types.

TYPE 1: A discovery procedure used when resources for discovery signal transmission are allocated on a non UE-specific basis. The resources may be for all UEs or a group of UEs.

TYPE 2: A discovery procedure used when resources for discovery signal transmission are allocated on a UE-specific basis.

TYPE 2A: Resources are allocated for each specific transmission instance of discovery signals.

TYPE 2B: Resources are semi-persistently allocated for discovery signal transmission.

Figure 10:
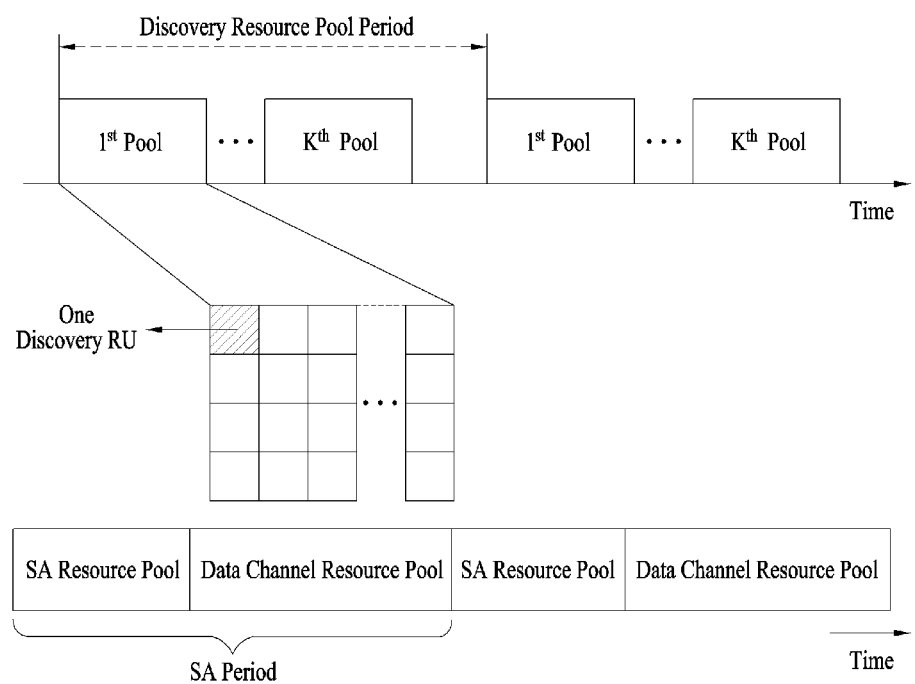
FIG. 10 illustrates a case wherein a resource pool related to a discovery message periodically appears.

FIG. 10 illustrates a case where a resource pool related to a discovery message (hereinafter, referred to as a "discovery resource pool") periodically appears. In FIG. 10, the period in which the resource pool appears is indicated by "Discovery Resource Pool Period". In FIG. 10, among multiple discovery resource pools configured within (one) discovery resource pool period, specific discovery resource pool(s) may be defined as serving cell-related discovery transmission/reception resource pool(s), and the other (remaining) discovery resource pool(s) may be defined as neighbor cell-related discovery reception resource pool(s).

Based on the description above, a D2D synchronization signal (D2DSS) resource configuration method and conditions for D2DSS transmission proposed by the present invention will be described.

First, consider the case of an in-coverage (or in-network (in-NW)) UE.

At most one D2DSS resource per cell may be configured for in-coverage UEs. Here, the D2DSS resource includes a periodically appearing subframe satisfying the following conditions i) and ii). The D2DSS may be transmitted in the subframe that appears periodically (e.g., the eNB will use resources not used for D2DSS transmission (for WAN communication)). i) The period of the D2DSS resource is the same for the in-coverage UE and the out-of-coverage UE, and may be pre-fixed to 40 ms. ii) In configuring D2DSS resources, a time offset in units of subframes may be configured, and a D2DSS resource offset of neighbor cells (e.g., a time offset in units of subframes for SFN #0 of a serving cell) may be signaled through the SIB.

A UE to transmit SA or D2D data transmits a D2DSS in each subframe satisfying (some or all of) the following conditions within a D2DSS resource.

The subframe does not conflict with cellular transmission in view of the UE

Predefined conditions such as the capabilities of the UE are satisfied

The subframe is within the SA or D2D data period in which SA or D2D data is transmitted.

If the UE is in the RRC_Connected state and the eNB instructs (through dedicated signaling) the UE to start D2DSS transmission, and/or other conditions are satisfied if the UE is not transmitting SA or D2D data in a subframe within the SA or data period, and/or all (some) of the following conditions are satisfied:

An RSRP threshold for D2D communication-related D2DSS transmission is configured using SIB. Here, for example, the threshold is set to a value in $\{-\infty, -115, \ldots, -60$ (increment by 5), $+\infty\}$ dBm.

The RSRP value of the UE is less than the threshold.

The eNB has not instructed the UE (by dedicated signaling) to stop D2DSS transmission.

In the case of a discovery UE, for each discovery pool, the UE shall transmit D2DSS in the first subframe of the discovery pool when this subframe of the discovery pool is in the D2DSS resource, or otherwise in the latest subframe of the D2DSS resource before the starting point of the discovery pool, if (some or all of) the following conditions are satisfied:

The subframe does not conflict with cellular transmission from the perspective of the UE;

The UE does not perform scanning for other D2DSSs;

Predefined conditions, including, for example, the capabilities of the UE, are satisfied;

The UE transmits a discovery message in the discovery pool.

The UE is RRC_Connected and the eNB has instructed the UE (by dedicated signaling) to start D2DSS transmission, and/or all (or some) of the following conditions are satisfied:

An RSRP threshold for D2DSS transmission related to D2D discovery is configured using SIB. Here, for example, the threshold may be set to a value in the range of $\{-\infty, -115, \ldots, -60$ (increment by 5), $+\infty\}$ dBm.

The RSRP value of the UE is less than the threshold.

The eNB has not instructed (by dedicated signaling) the UE to stop D2DSS transmission.

Hereinafter, an out-of-coverage (or out-network (out-NW)) UE will be described. The out-of-coverage UE does not transmit D2DSS on more than one D2DSS resource. Here, for example, two D2DSS resources are used for the out-of-coverage UE. Here, for example, the position of the D2DSS resource may be preconfigured (with respect to DFN #0 (or on DFN #0)), or signaled.

For example, when the D2D RX UE receives neighbor cell-related synchronization error information of w1/w2 (through a predefined higher layer signal), a discovery reference synchronization window having the size of ±w1/±w2 is assumed for the neighbor cell D2D resource (and/or neighbor cell discovery resource pool) (See Table 3).

TABLE 3

Figure 11:
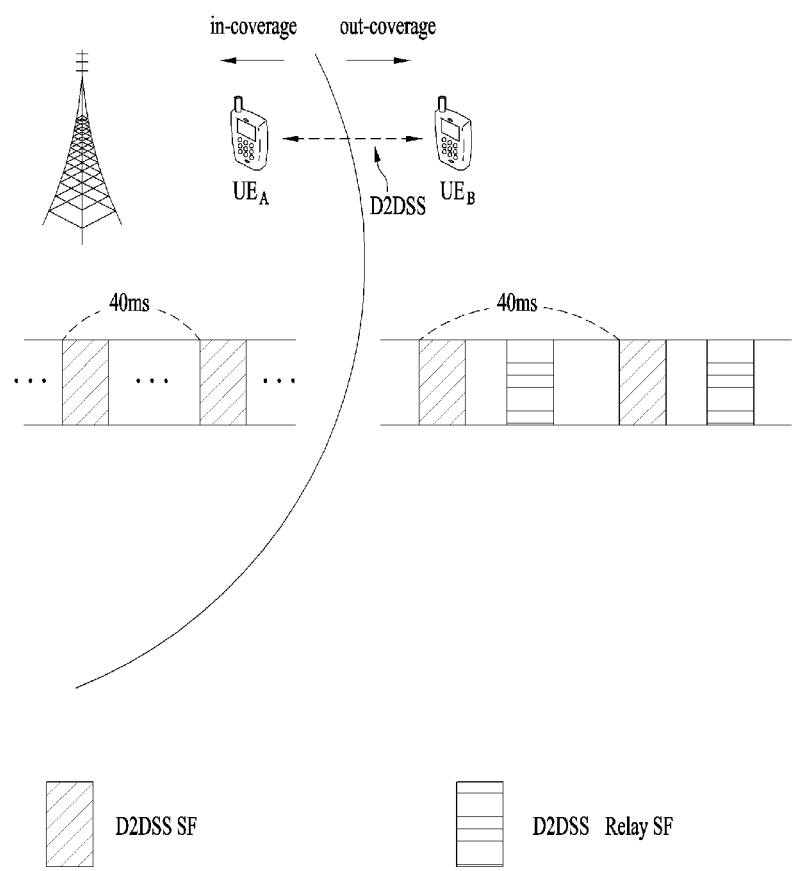
FIG. 11 is a reference diagram illustrating D2DSS subframe (SF) configurations and D2DSS relay SFs for the in-coverage UE and the out-of-coverage UE described above.

If higher layer indicates w1 in a given neighbor cell, UE may assume for the purpose of discovery a reference synchronization window of size +/−w1 ms for that neighbour cell with respect to neighbour cell D2DSS resource
    w1 is a fixed value and decided
    UE may assume D2DSS is transmitted in that cell
If higher layer indicates w2 in a given neighbor cell, UE may assume for the purpose of discovery a reference synchronization window of size +/−w2 ms for that neighbour cell with respect to neighbour cell with respect to neighbour cell discovery resource
    Exact value of w2 is decided
    RAN1 recommend w2 as not greater than CP length (of the order of CP length)
UE expects that D2DSS indicated by the resource pool configuration appears only within signaled reference synchronization window FIG. 11 is a reference diagram illustrating D2DSS subframe (SF) configurations and D2DSS relay SFs for the in-coverage UE and the out-of-coverage UE described above.

Referring to FIG. 11, for the in-coverage UE (e.g., UEa) present in the coverage of the eNB, at most one D2DSS resource (e.g., D2DSS SF) per cell may be configured. On the other hand, for the out-of-coverage UE outside the coverage of the eNB, (one) D2DSS resource aligned with the D2DSS resource for the in-coverage UE and (another) D2DSS resource (e.g., D2DSS relay SF) for D2DSS relay may be configured together.

Figure 12:
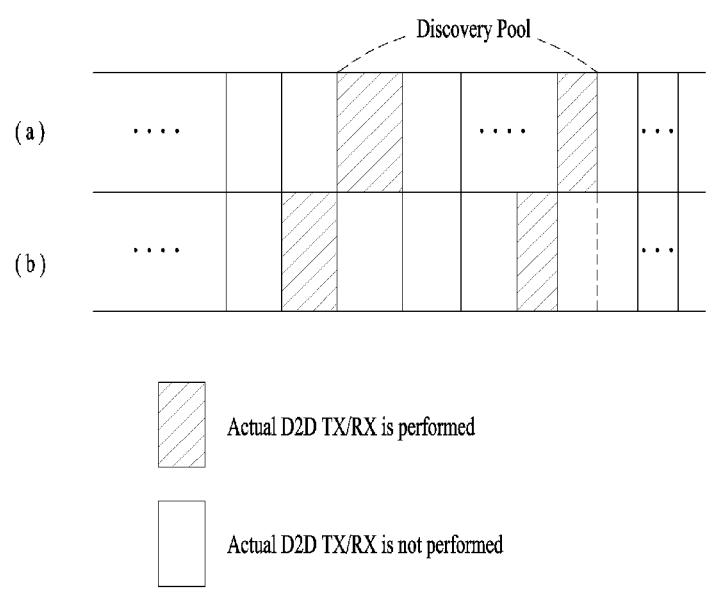
FIG. 12 shows the position of a resource pool through which a D2DSS is transmitted.

FIG. 12 shows the position of a resource pool through which a D2DSS is transmitted. Referring to FIG. 12, the D2DSS may be transmitted in (a) the first subframe of the discovery pool or (b) a subframe which is the last D2DSS resource before the start point of the discovery pool.

The conditions for transmitting the D2DSS may be different between the in-coverage UE and the out-of-coverage UE. For example, in the case of the in-coverage UE, i) D2DSS transmission may be instructed by the eNB through dedicated signaling, or ii) whether or not to transmit D2DSS may be determined according to a (pre-established or indicated) RSRP condition. In the case of the Out-of-Coverage UE, whether or not to transmit D2DSS may be determined based on (energy) measurement/detection of the physical sidelink broadcast channel (PSBCH) DMRS. Here, for example, if a signal (e.g., PSBCH DMRS) greater than or equal to a certain threshold is not measured/detected (within a certain region/distance), the UE determines that there is no synchronization source (within the certain region/distance) and performs D2DSS transmission (as an independent synchronization source (ISS)). While FIG. 12 illustrates only discovery (pool)-related D2DSS transmission for simplicity, application of the present invention may extend to D2DSS communication (for example, SA, D2D data) (pool)-related D2DSS transmission.

Based on the above description, the operation of the IN-NW UE will be described first. D2DSS transmission may be an optional feature of D2D capable UEs. Therefore, for example, it is preferable to allow only the D2DSS supporting UE to transmit the D2DSS.

A discovery UE transmits D2DSS in a single subframe in each discovery period. Such operation may be sufficient for discovery which is performed only for in-NW UEs. That is, as the in-NW UE is synchronized to a cell, the frequency error between the transmitter UE and the receiver UEs is limited, and D2DSS detection in a single subframe may be sufficiently reliable. In this case, no separate condition may be necessary for D2DSS scanning because the serving cell may provide D2DSS resources of neighboring cells and D2DSS resources of multiple cells may be separated in time by network configuration. The UE may not be able to transmit a discovery signal in a resource pool due to, for example, the conflict with the WAN UL TX.

Thus, the condition "the UE transmits a discovery message in the discovery pool," which is one of the above-described discovery-related D2DSS transmission conditions needs to be changed to "the UE intends to transmit a discovery message in the discovery pool."

With regard to communication, it may be considered whether or not the D2DSS needs to be transmitted before SA transmission (note that data cannot be transmitted before SA transmission). This is because the D2DSS resource may not be present before the SA subframes within an SA/data period. In this case, the SA may be transmitted first and then the D2DSS may be transmitted. That is, if synchronization needs to be established before SA reception, a condition similar to what is adopted for discovery (related D2DSS transmission) may be added.

In this case, however, D2DSS transmission in a single subframe may fail to provide reliable synchronization performance for out-NW UE(s) which may have a large initialization frequency offset. Therefore, D2DSS is more preferably transmitted in a plurality of subframes prior to SA transmission. Here, for example, a time limitation may be required for the corresponding preceding D2DSS transmission. This is because it will be difficult for a UE to make an exact prediction on the intention of SA transmission if the time gap between the D2DSS subframe and the SA subframe is large.

Hereinafter, a description will be given of whether or not to transmit D2DSS when SA or data is not transmitted within the SA/data period. The operation for communication should be different from that for discovery in the sense that D2DSS for communication needs to be received by out-NW UEs. To be specific, an out-NW UE may have a large frequency error and thus D2DSS detection performance should be reliable.

To ensure faster synchronization of out-NW UEs, in-NW UEs need to transmit D2DSS continuously at least for some (predetermined) time duration such that out-NW UEs may detect D2DSS at least once in a set of continuous D2DSS transmission subframes.

Furthermore, considering that out-NW UEs perform D2DSS measurement for the synchronization reference selection and determination of whether the D2DSS transmission condition is satisfied, and that appropriate (or reliable) measurement requires averaging over several D2DSS subframes, it is preferable to avoid random on-off of D2DSS transmission on the time scale of 40 ms.

To this end, if a predetermined condition is satisfied, the UE may be set to transmit D2DSS even if the UE does not transmit SA or D2D data within the SA/data period. Hereinafter, this operation will be referred to as "condition for continuing D2DSS transmission."

This "condition for continuing D2DSS transmission" may be based on the principle that a UE continues (or continuously performs) D2DSS transmission for a (predetermined) time duration if it has transmitted D2DSS before. This principle may guarantee continuous D2DSS transmission which is helpful for D2DSS detection and measurement at the out-NW UEs.

Therefore, options 1-1 to 1-3 may be considered in the present invention, and FIG. 13 is a reference diagram illustrating options 1-1 to 1-3. These options will be discussed with reference to FIG. 13.

Option 1-1: A "D2DSS transmission timer" is defined. If a UE transmits D2DSS in subframe #n according to the condition "the subframe is within the SA or D2D data period in which SA or data is transmitted," it may continue to transmit D2DSS in subframe #n+40, #n+80, . . . , #n+K*40 even when it does not have SA/data to transmit. Here, K corresponds to the D2DSS transmission timer.

Option 1-2: The entire DFN range may be divided into several time partitions. Assuming that DFN ranges from 0 to 1023 (where 1 D2D frame corresponds to 10 ms), DFN partition x includes D2D frame x, x+1, . . . , x+M−1 (when divided into 1024/M DFN partitions). If a UE transmits D2DSS in a subframe belonging to DFN partition x, the UE continues to transmit D2DSS in the remaining D2DSS subframes in the DFN partition x. This option has an advantage that a receiver UE may know the time instance related to potential D2DSS transmission change after decoding DFN in the operatively connected (or associated) PD2DSCH.

Option 1-3: A "D2DSS measurement period" may be defined and a UE which transmitted D2DSS in a specific subframe also transmits D2DSS in a D2DSS measurement period associated with the specific subframe. For example, it may be defined that the closest D2DSS measurement period (to the specific subframe in which the UE has transmitted the D2DSS) is associated (with the specific subframe).

Regarding the conditions discussed above, it needs to be clarified that a UE shall not transmit D2DSS in a subframe not satisfying the conditions for D2DSS transmission. The eNB may be aware of at least a subset of subframes where no D2DSS is transmitted, and the D2DSS resources in these subframes may be used for cellular (communication) transmission.

That is, for in-coverage UEs,

A UE transmitting SA or D2D data transmits a D2DSS in each subframe satisfying (some or all of) the following conditions in the D2DSS resource.

The subframe does not conflict with cellular transmission from the perspective of the UE.

The UE is capable of D2DSS.

The subframe is within the SA or D2D data period in which SA or data is transmitted, and/or the subframe is within X ms from a subframe in which the UE intends to transmit SA, and/or the subframe satisfies the "condition for continuing D2DSS transmission."

The UE is RRC_Connected and the eNB has instructed the UE (by dedicated signaling) to start D2DSS transmission, or all (or some) of the following conditions are satisfied:

An RSRP threshold for D2D communication-related D2DSS transmission is configured, and the threshold value is set using SIB. Here, for example, the threshold may have a value in the range of $\{-\infty, -115 \ldots -60$ (increment by 5), $+\infty\}$ dBm;

The RSRP value of the UE is less than the threshold;

The eNB has not instructed the UE (by dedicated signaling) to stop D2DSS transmission.

For a discovery UE, for each discovery pool, the UE shall transmit D2DSS in the first subframe of the discovery pool if this subframe is in the D2DSS resource, or otherwise in the latest subframe of the D2DSS resource before the start of the discovery pool, if (some or all of) the following conditions are satisfied:

The subframe does not conflict with cellular transmission from the perspective of the UE;

The UE is capable of supporting D2DSS;

The UE intends to transmit a discovery message in the discovery pool;

The UE is RRC_Connected and the eNB has instructed the UE (by dedicated signaling) to start D2DSS transmission, or all (some) of the following conditions are satisfied:

An RSRP threshold for discovery D2DSS transmission is configured and the threshold value is set through SIB. Here, for example, the threshold takes a value in the range of $\{-\infty, -115 \ldots -60$ (increment by 5), $+\infty\}$ dBm;

The RSRP value of the UE is less than the threshold;

The eNB has not instructed the UE (by dedicated signaling) to stop D2DSS transmission.

If any of the above conditions are not satisfied, the UE does not transmit the D2DSS.

The following three options, namely, options 2-1 to 2-3, may be considered for the "condition for continuing D2DSS transmission."

Option 2-1: A D2DSS timer may be defined and a UE which transmitted D2DSS by the condition of SA/data transmission may maintain transmission of D2DSS without SA/data transmission until the timer expires.

Option 2-2: The entire DFN range is divided into multiple DFN partitions, and a UE which transmitted D2DSS in a subframe continues to transmit D2DSS during the DFN partition.

Option 2-3: A D2DSS measurement period is defined, and a UE which transmitted D2DSS in a subframe continues to transmit D2DSS in the associated D2DSS measurement period.

On behalf of reception of D2DSS, a reference synchronization window for discovery may be applied to communication. This is because discovery and communication share the same D2DSS resource. After receiving the discovery resource pools, the UE may recognize the exact location of D2DSS transmissions for discovery. Further, the D2DSS (reception)-related UE assumption within the synchronization window may be limited to the case of w1. This is because D2DSS may be omitted or transmitted outside the synchronization window in the case of w2.

Therefore, the reference synchronization window may be applied to both discovery and communication based on the principle of "UE expects that D2DSS indicated by the resource pool configuration appears only within signaled reference synchronization window if w1 is indicated."

Next, OUT-NW UEs will be described. For example, it is important to minimize the number of D2DSSs that the OUT-NW UE needs to track. That is, a UE can track only a limited number of D2DSSs, so the UE may not receive all incoming SA and data if the number of incoming D2DSSs associated with the incoming SA and data exceeds the limit.

Thus, as the UE capability of tracking different timings is limited, it is necessary to consider the following UE behaviors:

1) A UE synchronized to a D2DSS transmits the same D2DSS in order to create a synchronization cluster sharing a common timing;

2) Only data TX UEs may be Independent Synchronization Sources (ISSs);

3) The ISS excludes a D2DSS sequence in D2DSS reselection if it transmitted the same sequence in the previous period.

Therefore, the procedure of D2DSS sequence selection is determined in the following three steps. For simplicity, in the following description, "a set of D2DSS sequence(s) transmitted by UE when the transmission timing reference is an eNB" is referred to as D2DSS_net, and "a set of D2DSS sequence(s) transmitted by UE when the transmission timing reference is not an eNB" is referred to as D2DSSue_oon.

Step 1: If an OUT-NW UE selected D2DSS X of D2DSSue_net as its transmission timing reference, the UE selects D2DSS Y from D2DSSue_oon and transmits the selected D2DSS Y when transmitting D2DSS. This selection may be random, or the UE may avoid/prevent selection of the D2DSS detected in the transmission timing reference selection procedure.

Step 2: If the UE selected D2DSS Z from D2DSSue_oon as its transmission timing reference, the UE transmits the same D2DSS Z when transmitting D2DSS.

Step 3: If the UE has D2D data traffic to transmit, it may become an Independent Synchronization Source (ISS) using D2DSS randomly selected from D2DSSue_oon.

Step 2 enables D2DSS relaying operation which reduces the number of D2DSSs in the system in consideration that a UE synchronized to a D2DSS transmits the same D2DSS in order to create a synchronization cluster sharing a common timing.

Further, considering that the ISS excludes a D2DSS sequence in the D2DSS reselection if it transmitted the same sequence in the previous period, the ISS which has performed (or initiated) D2DSS Z transmission assumes, in step 2, that D2DSS Z is not detected so that it may be synchronized to another D2DSS. In other words, the ISS may maintain the ISS operation only when it detects, during the reselection procedure, no D2DSS other than the one it transmitted before reselection. After this procedure, the out-NW UE may determine a D2DSS sequence to be used in transmitting D2DSS.

Further, in the present invention, "detecting D2DSS" is specifically defined. This is because it is not appropriate that the D2DSS is assumed to have been detected and used as a reliable synchronization source when the associated PD2DSCH is not correctly decoded or the quality of PD2DSCH reception is very poor. Specifically, a UE may assume that D2DSS is not detected (so the D2DSS does not affect the D2D synchronization procedure of the UE) if the quality of the associated PD2DSCH reception (RSRQ of the PD2DSCH DM RS, for example) is below a certain level.

Thus, according to the present invention, the following configurations may be adopted for D2DSS sequence selection.

If a UE selects D2DSSue_oon as its transmission timing reference, it transmits the same D2DSS.

A UE assumes that UEs transmitting the same D2DSS are synchronized.

Hereinafter, conditions under which an OUT-NW UE transmits D2DSS using the D2DSS sequence selected in the above procedure will be described. Basically, the formulation for the condition of D2DSS transmission for in-NW UEs may be reused. For a UE which is not an ISS, D2DSS is transmitted regardless of SA/data transmission from the UE if D2DSS from another UE is detected. That is, an additional condition may be needed for D2DSS transmission from a non-ISS UE. For example, the RSRP threshold may be replaced by the D2DSS measurement threshold, and any eNB configuration part may be removed.

In order to perform reliable D2DSS detection and measurement of the OUT-NW UE, D2DSS transmission prior to SA transmission and the condition for continuing D2DSS transmission may also be needed.

Therefore, the following conditions may be used to determine whether an out-NW UE transmits D2DSS in a subframe:

For out-of-coverage UEs,
  The UE which is an independent synchronization source (ISS) shall transmit D2DSS in each subframe in the D2DSS resource which the UE has selected for D2DSS transmission, if: i) the subframe is within the SA or D2D data period in which SA or data is transmitted, and/or (ii) the subframe is within X ms from a subframe in which the UE intends to transmit SA, and/or (iii) the subframe satisfies the "condition for continuing D2DSS transmission."
  The UE which is not an independent synchronization source shall transmit D2DSS in each subframe in the D2DSS resource that is not used to receive its transmission synchronization reference, if: i) the subframe is within the SA or D2D data period in which SA or data is transmitted, and/or the subframe is within X ms from a subframe in which the UE intends to transmit SA, and/or the subframe satisfies the "condition for continuing D2DSS transmission," and/or D2DSS of the transmission synchronization reference of the UE is detected within a (preconfigured) time window, and/or (ii) D2DSS measurement of the transmission timing reference is less than the threshold.

Further, only two D2DSS resources are configured as the D2DSS transmission resources, and the out-NW UEs receive the D2DSS from the synchronization references thereof on one D2DSS resource while transmitting the D2DSS on the other D2DSS resources.

For out-of-coverage UEs, synchronization resources that are periodically given are used for transmission of D2DSS. Here, for example, a PD2DSCH (if supported) may be transmitted when D2DSS is transmitted. In addition, for example, the size of a synchronization resource may be predefined, and the periodicity of the synchronization resources may be preconfigured.

When a D2D synchronization source transmits a D2DSS on a synchronization resource, it transmits D2DSS on at least one synchronization resource and receives D2DSS from at least one other synchronization resource. Here, the synchronization resources for transmitting (and/or receiving) the D2DSS may be preconfigured. As a further example, a timing offset between the synchronization resource for D2DSS reception and the synchronization resource for D2DSS transmission may be set.

Therefore, according to the present invention, in order to ensure reception of D2DSS from other UEs, the UE transmits no (other) D2D signal/channel in a (D2DSS) subframe that is not used for the D2DSS transmission thereof.

Hereinafter, a description will be given of whether or not the D2D-silent period is required when the UE performs the D2DSS reselection procedure. Even if the synchronization resources appear periodically and the UE does not transmit any (other) D2D signals on (other) synchronization resources except for the one used for its own D2DSS transmission, there may be D2DSS transmissions from eNBs or UEs not synchronized with this periodic synchronization resources (on a synchronization resource which is not used for D2DSS transmission of the UE). Thus, in order to allow UEs to efficiently scan any potential asynchronous D2DSSs, it is necessary to define the D2D-silent period in which D2DSS scanning is not interrupted (or interfered with) by transmissions from D2D UEs in close proximity thereto. If this period is not defined, an out-NW UE may be unable to detect a weak D2DSS with a higher priority from an eNB or in-NW UE due to interference from the other out-NW UEs.

Thus, in the present invention, a "D2D-silent period" defined as a multiple of the D2DSS period length may be defined to support scanning of out-NW UEs for other synchronization sources.

Based on the above description, a description will be given below of a WAN DL signal reception operation that a D2D RX UE (i.e., "SRXCH_D2D RX UE") of a single RX chain assumes upon receiving a D2D discovery signal.

TABLE 4

For FDD carriers:
  At least for UEs with a single Rx chain (FFS subject to the UE capability discussion whether this also applies for UEs with a shared D2D/cellular Rx chain), a UE that is receiving D2D discovery signals on an UL carrier is not expected to read DL signals on the DL carrier paired to such UL carrier during the subframes belonging to the D2D discovery pools on that UL carrier as well as one subframe preceding and following these subframes
    The discovery pools are configured by the eNB by broadcast or UE-specific signaling
      FFS: For RRC_CONNECTED UEs, 1 bit may be signalled using RRC signaling indicating whether this rule applies or not (on a per UE basis)
  Cellular measurement gaps subframes are excluded from this rule
  Paging reception is prioritized over D2D reception
For TDD carriers:
  A UE configured by the eNB to monitor D2D on a certain carrier is expected to read DL signals on that carrier according to legacy procedures.

An example of a synchronization assumption/configuration for receiving an inter-cell discovery signal (or neighbor cell discovery signal) of the D2D RX UE is shown in Table 3. For example, when the D2D RX UE receives neighbor cell-related synchronization error information of w1/w2 (through a predefined higher layer signal), a discovery reference synchronization window having a size of ±w1/±w2 is assumed for the neighbor cell D2D resources (e.g., a neighbor cell D2DSS resource (and/or the neighbor cell discovery resource pool)) (See Table 3)

As a specific example, if a neighbor-cell D2DSS resource is configured in the serving-cell SF #N, the D2D RX UE assumes that the neighbor-cell D2DSS may be received in the range from SF #N−w1 to SF #N+w1. Further, when the D2D RX UE receives neighbor-cell related synchronization error information of w2 (through a predefined higher layer signal), it assumes a discovery reference synchronization window having a size of ±w2 for the neighbor-cell discovery resource. As a specific example, if a neighbor-cell discovery resource is configured in serving-cell SF #K, the D2D RX UE assumes that neighbor-cell discovery may be received in the range from SF #K−w2 to SF #K+w2.

In the proposed embodiments of the present invention described below, methods for efficiently receiving WAN downlink signal(s) in DL SF(s) at least partially (i.e., partially or fully) overlapping in the time domain when a D2D RX UE of a single RX chain receives D2D signal(s) in a pre-configured or signaled D2D signal resource pool and/or D2DSS(s) (operatively connected with the D2D signal resource pool) in an environment in which D2D communication is performed are proposed.

Hereinafter, for simplicity, the D2D RX UE of a single RX chain will be referred to as "SRXCH_D2D RX UE." In the present invention, the "SRXCH_D2D RX UE" may be interpreted as, for example, a UE having a relatively small number of RX chains compared to the number of RX chains required for a simultaneous reception operation related to a WAN DL signal/channel and/or a D2D signal/channel. In addition, for example, it is difficult for the SRXCH_D2D RX UE to simultaneously receive the D2D signal(s) (i.e., UL CARRIER(s)) and WAN downlink signal(s) (i.e., DL CARRIER #X paired with UL CARRIER #X) transmitted in time resource regions at least partially (i.e., partially or fully) overlapping on different carriers (or frequency bands) due to one RX chain, or D2DSS(s) and WAN downlink signal(s). For example, the corresponding SRXCH_D2D RX UE will receive i) D2D signal(s)(/D2DSS(s)) and WAN downlink signal(s) or ii) D2DSS(s) and WAN downlink signal(s) which are transmitted in different time resource regions on different carriers (or frequency bands), through a carrier (or frequency band) switching operation of a single RX chain.

The DL SF(s) overlapping at least partially (i.e., partially or fully) in terms of time domain may be interpreted as at least one of: i) DL SF(s) at least partially (i.e., partially or fully) overlapping all the SF(s) within a time interval in which the D2D signal resource pool configuration related bitmap is applied; ii) DL SF(s) at least partially (i.e., partially or fully) overlapping D2DSS(s) (valid in relation to reception of the D2D signal resource pool or D2D signal(s)) in a time resource region; iii) DL SF(s) at least partially (i.e., partially or fully) overlapping one SF preceding the D2D signal pool (shown in Table 4) and one following SF (i.e., SF(s) for ensuring a time necessary for carrier (or frequency band) switching operation of a single RX chain) in the time resource region, iv) DL SF(s) at least partially (i.e., partially or fully) overlapping, in the time resource region, SF(s) actually configured as D2D SF(s) among the SF(s) within the time interval in which the D2D signal resource pool configuration related bitmap is applied; and v) DL SF(s) at least partially (i.e., partially or fully) overlapping, in the time resource region, one SF preceding D2DDD(s) (valid for D2D signal resource pool or D2D signal(s) reception) and one SF (i.e., SF(s) for ensuring a time necessary for carrier (or frequency band) switching operation of the single RX chain) following the D2DSS(s).

Hereinafter, for simplicity, the DL SF(s) will be referred to as "INV_DL SF(s)" (or "DL gap") and the SRXCH_D2D RX UE will be interpreted as not receiving WAN downlink signal(s) in the corresponding INV_DL SF(s) (or DL gap) when receiving D2D signal(s)/D2DSS(s). In addition, a pre-configured or signaled D2D signal resource pool may be interpreted as at least one of a serving-cell related D2D signal resource pool and/or a neighbor-cell related D2D signal resource pool. Further, the position of a valid D2DSS resource related to at least one of i) D2D SA reception, ii) D2D DATA reception, iii) D2D discovery SIGNAL reception and iv) D2D discovery pool may be assumed according to the D2DSS resource configuration described above.

The embodiments of the present invention described below assume a situation in which the SRXCH_D2D RX UE receives, in a pre-configured or signaled (serving-cell/neighbor-cell) D2D signal resource pool, discovery signal(s) and/or D2DSS(s) (associated with the (serving-cell/neighbor-cell) D2D signal resource pool). However, the proposed methods of the present invention may be extended to a situation in which other types of D2D signals (e.g., D2D communication signals) are received. In addition, the methods proposed below may be configured to be applied only to the FDD carrier-based D2D signal/D2DSS reception operation.

<Method 1>

In accordance with the present invention, when the SRXCH_D2D RX UE receives D2DSS(s) associated with a D2D signaling resource pool (of a serving-cell/neighbor-cell), the UE may be configured to assume that not only i) DL SF(s) at least partially (i.e., partially or fully) overlapping the corresponding D2DSS resource(s) (or D2DSS SF(s)) in a time resource region, but also ii) DL SF(s) at least partially (i.e., partially or fully) overlapping one SF before D2DSS resource(s) (or D2DSS SF(s)) and one SF following the D2DSS resource(s) (i.e., SF(s) for ensuring a time necessary for carrier (or frequency band) switching operation of a single RX chain) in a time resource region are INV_DL SF(s).

Also, when the SRXCH_D2D RX UE receives, in a preconfigured or pre-signaled neighbor-cell discovery resource pool, discovery signal(s) and/or D2DSS(s) (associated with the neighbor-cell discovery resource pool), INV_DL SF(s) may be defined/configured according to at least some (i.e., some or all) of the following rules.

Hereinafter, it is assumed that the SRXCH_D2D RX UE has received neighbor-cell related synchronization error information of w1 (or w2) (through a predefined higher layer signal) (see Table 4). In this case, i) the SRXCH_D2D RX UE assumes that a neighbor-cell D2DSS may be received in the range from SF #N−w1 to SF #N+w1 (i.e., when the neighbor cell D2DSS resource is set on the serving cell SF #N), or ii) the SRXCH_D2D RX UE assumes that neighbor-cell discovery may be received in the range from SF #K−w2 to SF #K+w2 (if a neighbor-cell discovery resource is configured in serving-cell SF #K).

Example 1-1

According to a first embodiment of the present invention, the SRXCH_D2D RX UE needs to perform blind search on a region from SF #N−w1 to SF #N+w1 to receive (or detect) a neighbor-cell D2DSS due to the D2D RX neighbor-cell related synchronization error (i.e., when a neighbor-cell D2DSS resource is configured in serving-cell SF #N).

For this operation, when the SRXCH_D2D RX UE receives a neighbor-cell D2DSS (associated with a preconfigured or signaled neighbor-cell discovery resource pool), i) the UE may be configured to assume that not only i) DL SF(s) at least partially (i.e., partially or fully) overlapping a region from SF #N-CEILING(w1) to SF #N+CEILING(w1) in a time resource region, but also ii) DL SF(s) at least partially (i.e., partially or fully) overlapping, in the time resource region, one SF preceding the region from SF #N-CEILING(w1) to SF #N+CEILING(w1) and one SF following the region (i.e., SF(s) for ensuring a time necessary for carrier (or frequency band) switching operation of a single RX chain) are INV_DL SF(s).

In other words, the SRXCH_D2D RX UE assumes that DL SF(s) at least partially (i.e., partially or fully) overlapping a region from SF #N-CEILING(w1)−1 to SF #N+CEILING(w1)+1 in the time resource region are INV_DL SF(s). Here, CEILING (X) represents a function that derives a minimum integer greater than or equal to X.

In another example, in the same situation, the SRXCH_D2D RX UE may be finally configured to assume that DL SF(s) at least partially (i.e., partially or fully) overlapping the region from SF #N-CEILING(w1) to SF #N+CEILING(w1) in the time resource region are INV_DL SF(s) (if w1 is less than a pre-configured or signaled threshold, namely, if the time necessary for the carrier (or frequency band) switching operation is secured without additional INV_DL SF(s)).

In another example, (in the same situation) the SRXCH_D2D RX UE needs to perform blind search on a region from SF #P-w1 to SF #P+w1 to receive/detect neighbor-cell discovery due to the D2D RX neighbor-cell related synchronization error (i.e., when a neighbor-cell discovery resource is configured in serving-cell SF #P).

For this operation, the SRXCH_D2D RX UE may be configured to: i) assume that DL SF(s) at least partially (i.e., partially or fully) overlapping a region from the starting SF-CEILING(w1)−1 to the ending SF+CEILING(w1)+1 in a neighbor-cell discovery pool in the time resource region are INV_DL SF(s), ii) assume that DL SF(s) at least partially (i.e., partially or fully) overlapping a region from the starting SF-CEILING(w1) to the ending SF+CEILING(w1) in a neighbor-cell discovery pool in the time resource region are INV_DL SF(s) (if w1 is less than a pre-configured or signaled threshold), or iii) assume that DL SF(s) at least partially (i.e., partially or fully) overlapping a region from SF #P-CEILING(w1)−1 to SF #P+CEILING(w1)+1 (or a region from SF #P-CEILING(w1) to SF #P+CEILING(w1)) in the time resource region (if w1 is less than a preconfigured or signaled threshold)) are INV_DL SF(s) (i.e., this may be interpreted as meaning that only SF(s) actually configured as discovery SF(s) among the SF(s) within a time interval in which a bitmap related to the neighbor-cell discovery pool configuration is applied in configuring INV_DL SF(s)).

As another example, if the ending SF of the time interval in which the bitmap related to the (serving-cell/neighbor-cell) discovery pool configuration is applied is a non-D2D SF (or non-discovery SF), DL SF(s) at least partially (i.e., partially or fully) overlapping one SF after the ending SF in the time resource region may not be assumed to be the INV_DL SF(s).

In another example, if an SF sequence of "NON-D2D SF, D2D SF, NON-D2D SF" appears in the time interval in which the bitmap related to the (serving-cell/neighbor-cell) discovery pool configuration is applied, DL SF(s) at least partially (i.e., partially or fully) overlapping one SF preceding the corresponding D2D SF and one SF following the corresponding D2D SF may be assumed to be INV_DL SF(s). Alternatively, if an SF sequence of "NON-DISCOVERY SF, DISCOVERY SF, NON-DISCOVERY SF" appears within the time interval in which the bitmap related to the (serving-cell/neighbor-cell) discovery pool configuration is applied, DL SF(s) at least partially (i.e., partially or fully) overlapping one SF preceding the corresponding discovery SF and one SF following the discovery SF in the time resource region may be assumed to be INV_DL SF(s).

As another example, if D2DSS transmission is configured in (UL) SF(s) that are not indicated by "1" in the bitmap related to (serving-cell/neighbor-cell) discovery pool configuration or (UL) SF(s) which are not indicated by "1" in the bitmap (which means D2D SF (or DISCOVERY SF)) are defined as D2DSS resources within the time interval in which the bitmap is applied, D2DSS transmission may be configured to be exceptionally performed. Alternatively, if D2DSS transmission is configured in (UL) SF(s) that are not indicated by "1" in the bitmap related to (serving-cell/neighbor-cell) discovery pool configuration or (UL) SF(s) which are not indicated by "1" in the bitmap are defined as D2DSS resources within a time interval in which the bitmap is applied, D2DSS transmission may be exceptionally configured not to be performed.

In another example, if the SRXCH_D2D RX UE performs blind search on a region from SF #N−w2 to SF#N+w2 to receive/detect D2DSS neighbor/cell D2DSS (associated with a pre-configured or signaled neighbor-cell discovery resource pool) due to the D2D RX neighbor-cell related synchronization error (i.e., when neighbor-cell D2DSS resources are configured in serving-cell SF #N), the UE may be configured to assume that DL SF(s) at least partially (i.e., partially or fully) overlapping at least one of the region from SF #N−1 to SF #N+1, the region from SF #N-CEILING(w2)−1 to SF #N+CEILING(w2)+1 and the region from SF #N-FLOOR(w2)−1 to SF #N+FLOOR(w2)+1 in the time resource region are INV_DL SF(s).

In another example, (in the same situation) the SRXCH_D2D RX UE needs to perform blind search on a region from SF #P−w2 to SF #P+w2 to receive/detect neighbor-cell discovery due to the D2D RX neighbor-cell related synchronization error (i.e., when a neighbor-cell discovery resource is configured in serving-cell SF #P).

For example, for this operation, the SRXCH_D2D RX UE may be configured to assume that DL SF(s) at least partially (i.e., partially or fully) overlapping, in the time resource region, one of i) a region from the starting SF−1 to the ending SF+1 in a neighbor-cell discovery pool, ii) a region from the starting SF-CEILING(w2)−1 to the ending SF+CEILING(w2)+1 in a neighbor-cell discovery pool, and a region from the starting SF-SF−FLOOR(w2)−1 to the ending SF−FLOOR(w2)+1 in a neighbor-cell discovery pool are INV_DL SF(s).

As another example, according to application of the rule "PAGING RECEPTION (AND/OR SIB RECEPTION) IS PRIORITIZED OVER D2D RECEPTION" in Table 4, if the (RRC_IDLE) D2D UE needs to receive a paging signal (and/or SIB) (SF #N) in the midst of performing at least one of i) the (neighbor/serving cell) discovery signal receiving operation in a (neighbor/serving cell) D2D signal resource pool and ii) the (neighbor/serving cell) D2DSS receiving operation associated with the (neighbor/serving cell) D2DSS signal resource pool, the UE may be configured not to perform the discovery signal receiving operation in SF(s) of the (neighbor/serving cell) D2D signal resource pool at least partially (i.e., partially or fully) overlapping the region from SF #N−1 to SF #N+1 (or SF #N) in the time resource region.

As another example, according to application of the rule "PAGING RECEPTION (AND/OR SIB RECEPTION) IS PRIORITIZED OVER D2D RECEPTION" in Table 4, if the (RRC_IDLE) D2D UE needs to receive a paging signal (and/or SIB) (SF #N) in the midst of performing at least one of i) the (neighbor/serving cell) discovery signal receiving operation in a (neighbor/serving cell) D2D signal resource pool and ii) the (neighbor/serving cell) D2DSS receiving operation associated with the (neighbor/serving cell) D2DSS signal resource pool, the UE may be configured not to perform the D2DSS signal receiving operation in (neighbor/serving cell) D2DSS SF(s) (or D2DSS resource) at least partially (i.e., partially or fully) overlapping the region from SF #N−1 to SF #N+1 (or SF #N) in the time resource region.

Here, as another example, the UE may be configured not to perform the discovery signal receiving operation in a (neighbor/serving cell) D2D signal resource pool at least partially (i.e., partially or fully) overlapping the time at which the paging signal (and/or SIB) is received.

Example 1-2

According to the first embodiment of the present invention, if i) the gap between a pre-signaled or configured neighbor-cell D2DSS resource offset and a neighbor-cell discovery resource pool offset, or ii) the gap between 'SF #N+CEILING(w1)+1' (or 'SF #N+CEILING(w1)') for neighbor-cell D2DSS reception related INV_DL SF(s) configuration described in Example 1-1 and the starting SF-CEILING(w1)−1' in the neighbor-cell discovery pool for the neighbor-cell D2DSS reception related INV_DL SF(s) configuration (or the starting SF-CEILING(w1) in the neighbor-cell discovery pool) is less than a pre-configured or signaled threshold, DL SF(s) at least partially (i.e., partially or fully) overlapping a region between 'SF #N+CEILING (w1)+1' (or 'SF #N+CEILING(w1)') for the neighbor-cell D2DSS reception related INV_DL SF(s) configuration described in Example 1-1 and 'the starting SF-CEILING (w1)−1 in a neighbor-cell discovery pool' for the neighbor-cell discovery reception related INV_DL SF(s) configuration (or 'the starting SF-CEILING(w1)' in the neighbor-cell discovery pool) in the time resource region may also be assumed/configured to be INV_DL SF(s). Here, by applying this assumption/configuration, frequent occurrence of the carrier (or frequency band) switching operation of a single RX chain may be attenuated.

In addition, for example, this assumption/configuration may be interpreted as meaning that if i) the gap between a pre-signaled or configured neighbor-cell D2DSS resource offset and a neighbor-cell discovery resource pool offset, or ii) the gap between 'SF #N+CEILING(w1)+1' (or 'SF #N+CEILING(w1)') for neighbor-cell D2DSS reception related INV_DL SF(s) configuration described in Example 1-1 and the starting SF-CEILING(w1)−1' in the neighbor-cell discovery pool for the neighbor-cell D2DSS reception related INV_DL SF(s) configuration (or the starting SF-CEILING(w1) in the neighbor-cell discovery pool) is greater than a pre-configured or signaled threshold, DL SF(s) at least partially (i.e., partially or fully) overlapping the region between 'SF #N+CEILING(w1)+1' (or 'SF #N+CEILING(w1)') for the neighbor-cell D2DSS reception related INV_DL SF(s) configuration described in Example 1-1 and 'the starting SF-CEILING(w1)−1 in a neighbor-cell discovery pool' for the neighbor-cell discovery reception related INV_DL SF(s) configuration (or 'the starting SF-CEILING(w1)' in the neighbor-cell discovery pool) in the time resource region are not assumed/configured to be INV_DL SF(s).

<Method 2>

As described above, a (serving-cell/neighbor-cell) D2DSS resource of a pre-fixed or configured periodicity may be operatively associated with multiple (serving-cell/neighbor-cell) D2D signal resource pools. Alternatively, one (serving-cell/neighbor-cell) D2DSS configuration may be used for multiple (serving-cell/neighbor-cell) D2D signal resource pools. Further, for example, the (serving-cell/neighbor-cell) D2DSS resource periodicity may be fixed to 40 ms.

In view of this characteristic, in configuring D2DSS(s) reception related INV_DL SF(s) operatively associated with the D2D signal resource pool(s), INV_DL SF(s) based on Method #1 described above may be configured, considering only the associated (serving-cell/neighbor-cell) D2DSS (Serving-cell/neighbor-cell) D2DSS positioned before (or prior to) the serving-cell/neighbor-cell) D2D signal resource pool that the UE desires to actually receive (i.e., the latest subframe of the D2DSS resource before the start of the discovery pool).

As an example of application of this configuration/assumption, the configuration/assumption may be interpreted as meaning that the SRXCH_D2D RX UE does not configure INV_DL SF(s) in consideration of the associated (serving-cell/neighbor-cell) D2DSS positioned before (or prior to) the (serving-cell/neighbor-cell) D2D signal resource pool that the UE does not actually receive or does not desire to actually receive. In addition, through application of this configuration/assumption, excessive INV_DL SF(s) configurations due to (serving-cell/neighbor-cell) D2DSS may be attenuated.

In addition, for example, this assumption/configuration may be applied only when the SRXCH_D2D RX UE is instructed, through predefined dedicated signaling (e.g., RRC signaling) (from the serving cell), to perform reception of (serving-cell/neighbor-cell) discovery only in a specific (serving-cell/neighbor-cell) D2D signal resource pool.

In another example, in accordance with Method #1 described above, in configuring (serving-cell/neighbor-cell) D2DSS(s) reception related INV_DL SF(s) configuration operatively associated with (serving-cell/neighbor-cell) D2D signal resource pool(s), the SRXCH_D2D RX UE may configure the corresponding INV_DL SF(s) considering only the related (serving-cell/neighbor-cell) D2DSS positioned before (or prior to) the serving-cell/neighbor-cell) D2D signal resource pool (i.e., the latest subframe of the D2DSS resource before the start of the discovery pool).

<Method #3>

If it is difficult to establish synchronization of the related/associated (serving-cell/neighbor-cell) D2D signal resource pool through one (serving-cell/neighbor-cell) D2DSS reception, Q pre-configured or pre-signaled (serving-cell/neighbor-cell) D2DSS(s) positioned before (prior to) the (serving-cell/neighbor-cell) D2D signal resource pool may be received/used.

In this case, the SRXCH_D2D RX UE may be caused to configure INV_DL SF(s) (according to Method #1 or Method #2 described above), considering the Q pre-configured or pre-signaled Q (serving-cell/neighbor-cell)

D2DSS (s) positioned before (or prior to) the (serving-cell/neighbor-cell) D2D signal resource pool.

Further, a method of configuring a usage index in relation to the discovery pool configuration may be defined as shown in Table 5.

TABLE 5

The discovery pools RRC configuration can indicate a usage index per pool to reserve the pool for specific usages
If more than 1 resource pool with the same usage index is configured for type 1 discovery, the network configures the method for the UE to select the resource pool among the pools with a given usage index; the following methods are supported:
    Random, subject to meeting the UE and network power configurations
        Default if no other method is configured
    UE RSRP measurement
        For each pool, an upper RSRP value and a lower RSRP value are configured
        For each value: {−infinity, −110 . . . −60, +infinity} dBm, increments of 10 dB The method for efficiently configuring INV_DL SF(s) (or DL gap) will be further described below. Based on Tables 4 and 3 above, the operation of Table 4 above is valid for the D2D discovery pools of the serving cell and a neighbor cell to which the window length of w2 is indicated.

However, for the pools of a neighbor cell to which a window length of w1 is indicated, a margin of 1 ms positioned before or after the discovery pool is not sufficient to accept cell timing ambiguity. In other words, the DL gap should be defined as subframes belonging to the discovery resource pools of the neighbor cell on the UL carrier, the ceil(w1)+1 preceding subframes, and the ceil(w1)+1 following subframes.

Further, the UE needs to receive the D2DSS appearing in the starting subframe of the discovery pool or in the latest subframe before the discovery pool.

In view of the above, a D2DSS subframe associated with the discovery pool of the neighbor cell and ceil(w1)+1 subframes preceding the D2DSS subframe and the ceil (w1)+1 subframes following the D2DSS subframe need to be configured as (additional) DL gaps.

Figure 14:
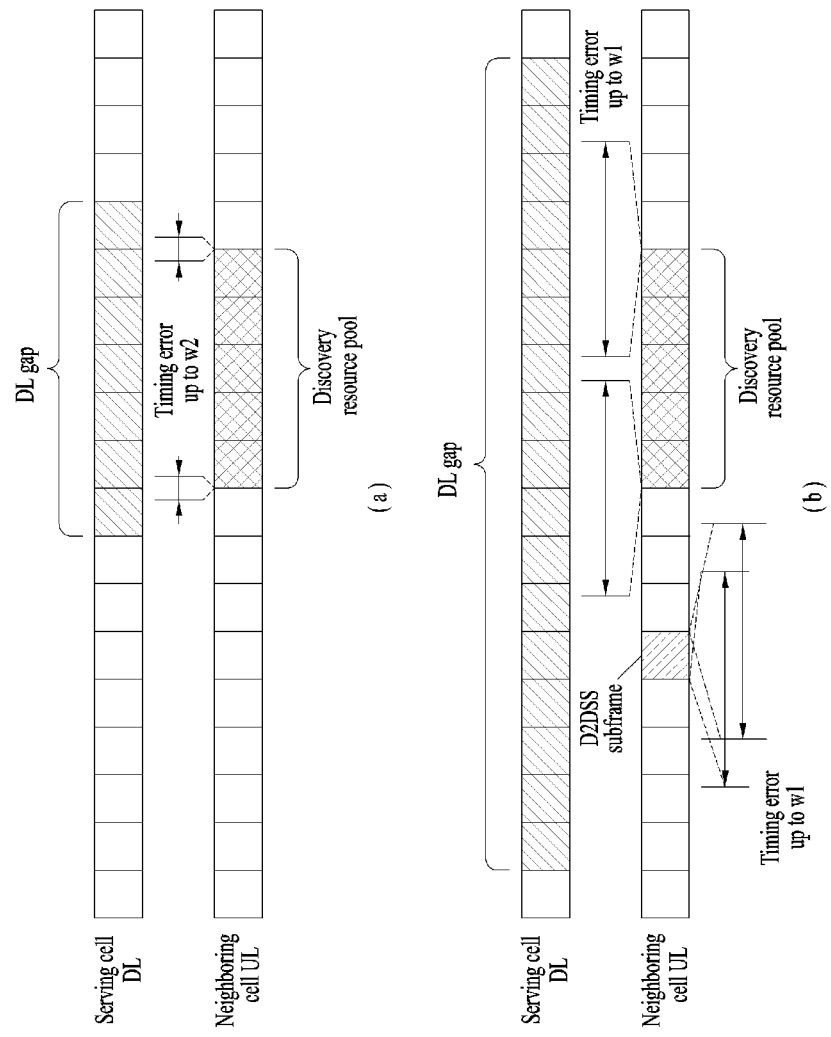
FIG. 14 is a reference diagram for comparing DL gaps required for neighbor cells of synchronization window lengths w2 and w1, in accordance with the present invention.

FIG. 14 is a reference diagram for comparing DL gaps required for neighbor cells of synchronization window lengths w2 and w1. FIG. 14(a) shows a DL gap required for a neighbor cell with the synchronization window length w2, and FIG. 14(b) shows a DL gap required for a neighbor cell with the synchronization window length w1.

It may be additionally considered whether the DL gap for the discovery pool and the associated D2DSS subframe are given as a single contiguous DL gap or as two independent (or separated) DL gaps. It may also be considered whether the DL gap for the D2DSS subframe can be configured for a UE that is not capable of supporting D2DSS.

For example, a DL gap associated with discovery may be applied to the discovery pools of the serving cell or to the discovery pools of the neighbor cell to which the synchronization window length w2 is indicated.

For a neighbor cell with a synchronization window length w1, the DL gap may be configured for the discovery pools, D2DSS subframes associated therewith, and ceil(w1)+1 subframes preceding the D2DSS subframes and ceil(w1)+1 subframes following the D2DSS subframes.

Hereinafter, whether the eNB can control the configuration of the DL gap for each UE will be discussed. Depending on UE capabilities and carrier aggregation (CA) configuration, a DL gap may not be needed for some UEs.

For example, if a UE is capable of both communication and discovery and a DL CA capable of supporting simultaneous reception of WAN DL and D2D has been configured, the UE may not need a DL gap for receiving discovery.

Even if the UE does not support D2D communication, UE capability signaling may be defined that indicates the condition (of the UE) for requiring a DL gap (or the need for a DL gap) (see Table 6).

TABLE 6

1. INTRODUCTION
    This contribution discusses the D2D UE capability. How to separate the features of Rel-12 D2D will be discussed first, and then how to define the D2D frequency bands will be discussed.
2. DISCUSSION
2.1 D2D FEATURES
    Considering many discussions on PS and non-PS services in D2D SI/WI, it is natural to separate the features of discovery and communication. In other words, a D2D-capable UE supports only communication, only discovery, or both of them. Regarding the two communication modes, we think that the following agreements made in RAN1#76 imply that a D2D communication capable UE shall support both modes. In our understanding the agreement, a D2D communication capable UE shall be able to be a transmitting UE using Mode 1 when it is inside network coverage, and, at the same time, it also shall be able to be a transmitting UE using Mode 2 when it is at the edge-of-coverage and/or outside network coverage. The definition "edge-of-coverage" is not cleared specified, but we think that it can include the exceptional case which uses Mode 2 for the resource allocation.
Agreements (RAN1#76):
        From a transmitting UE perspective a UE can operate in two modes for resource allocation:
            Mode 1: eNodeB or rel-10 relay node schedules the exact resources used by a UE to transmit direct data and direct control information
                FFS: if semi-static resource pool restricting the available resources for data and/or control is needed
            Mode 2: a UE on its own selects resources from resource pools to transmit direct data and direct control information
                FFS if the resource pools for data and control are the same
                FFS: if semi-static and/or pre-configured resource pool restricting the available resources for data and/or control is needed
            D2D communication capable UE shall support at least Mode 1 for in-coverage
            D2D communication capable UE shall support Mode 2 for at least edge-of-coverage and/or out-of-coverage
            FFS: Definition of out-of-coverage, edge-of-coverage, in-coverage
    It may be possible to separate the two discovery types in the supported features. On the other hand, the difference in the transmitter behavior in the two types may not be significant: The resource allocation within each discovery period would be identical, and the only difference is random selection vs. deterministic resource TABLE 6-continued hopping across discovery periods. We note that the receiver behavior is expected to be identical in the two discovery types, i.e., a receiver UE blindly searches each reception pool with no knowledge about the discovery type used in the transmitters.

The D2DSS-related feature can be separated from the features of communication and discovery. For example, if a UE is intended to be operated only inside the coverage of synchronized networks, the D2DSS-related operations do not need to be implemented. It is noteworthy that, even a UE not capable of D2DSS can support inter-cell D2D in un-synchronized networks because high layer signaling provides the cell ID together with the resource pools of neighboring cells [1] and such a UE can receive D2D signals from neighboring cell UEs by using PSS/SSS/CRS. Details of D2DSS features can be different in discovery and communication. By the following agreement, D2DSS in discovery does not require any PD2DSCH-related operations, while a communication UE should be able to transmit PD2DSCH if it can transmit D2DSS.

Agreement:
    Communication UEs transmitting D2DSS transmit PD2DSCH in in-coverage, out of coverage cases
    In coverage UEs participating only in discovery do not transmit PD2DSCH Considering that D2DSS sequences are divided into two sets, D2DSSue_net and D2DSSue_oon, a UE capable of only discovery does not need to transmit/receive a D2DSS belonging to D2DSSue_oon. This leads to two different features, one for D2DSSue_net and the other for PD2DSCH. By the above agreement, supporting PD2DSCH means supporting D2DSS as well, thus the feature PD2DSCH can have D2DSSue_net and D2DSSue_oon as the prerequisite. It would be a natural consequence that a UE which is not capable of D2DSS cannot transmit or receive D2D communication when it is outside network coverage, but such a UE may be able to communicate with some out-coverage UEs if these out-coverage UEs are synchronized to the serving cell timing which is relayed by D2DSS transmitted from some other in-coverage UEs.

The above discussions lead to the D2D features listed in Table 1. Some D2D feature combinations are listed in Table 2, and we note that more combinations can be considered, e.g., Feature B + D in the future releases where discovery for out-NW UEs is necessary.

Table 1: List of the D2D features

| Feature | Description |
|---|---|
| D2DSSue_net (Feature A) | The UE can transmit and receive D2DSS in D2DSSue_net. |
| PD2DSCH (Feature B) | The UE can transmit and receive D2DSS in D2DSSue_oon and PD2DSCH. The feature A is the prerequisite. |
| D2D communication (Feature C) | The UE can transmit and receive SA and data using Mode 1 and Mode 2. |
| D2D discovery (FeatureD) | The UE can transmit and receive discovery messages. FFS whether further separation is necessary for Type 1 and Type 2B. |

Table 2: Examples of D2D feature combinations

| Example case | Description |
|---|---|
| Case 1: Discovery without D2DSS | Feature D only. Inter-cell discovery can be supported by using neighboring cell's PSS/SSS/CRS. |
| Case 2: Discovery with D2DSS | Feature A + D. Inter-cell discovery based on D2DSS is supported. |
| Case 3: D2D communication without D2DSS | Feature C only. Inter-cell communication can be supported by using neighboring cell's PSS/SSS/CRS. |
| Case 4: D2D communication with D2DSS | Feature B + C (A is the prerequisite of B). Inter-cell communication based on D2DSS is supported. Communication outside network coverage is supported. |
| Case 5: Discovery and communication without D2DSS | Feature C + D. Inter-cell discovery and communication can be supported by using neighboring cell's PSS/SSS/CRS. |
| Case 6: Discovery and communication with D2DSS | Feature B + C + D (A is the prerequisite of B). Inter-cell discovery and communication based on D2DSS is supported. Communication outside network coverage is supported. |

Proposal 1: As the baseline, four D2D features are defined for D2DSSUE_net, PD2DSCH (including D2DSSue_net and D2DSSue_oon), D2D communication, and D2D discovery. Inter-cell D2D or out-coverage D2D can be supported by a proper combination of these features.

2.2 D2D FREQUENCY BANDS

In general, the eNB needs to know the D2D frequency bands supported by each UE. This knowledge is necessary especially for the assessment of impact across D2D and WAN which appears differently in the D2D reception and D2D transmission.

A. ISSUES IN D2D RECEPTIONS

It seems natural to define a list of frequency bands in which the UE can receive D2D. In defining the related UE capability, the impact of D2D reception on the WAN operation needs to be addressed together. First, in relation to WAN RX, the related agreement can be summarized as follows:
    For communication, receiving D2D in a FDD UL band may reduce the DL CA/MIMO capability [2].
    For discovery, receiving D2D in a FDD UL band requires "DL gap" in the paired DL band. FFS whether eNB can control the configuration of such DL gap [3].

One solution to reflect the agreement for communication can be to inform the network of the DL CA/MIMO capability which will be supported if the UE needs to participate in receiving communication in a certain frequency band. In other words, a UE reports the frequency band where D2D communication reception is supported with a certain DL CA band combination and MIMO capability. Detailed capability signaling design can be discussed in RAN2. In discovery reception capability, if it is supported for the eNB to control the configuration of "DL gap" for discovery [4], it can be useful if the eNB knows in which condition a certain UE requires such DL gap. We note that the discussed capability signaling for communication and discovery share the commonality that it describes the impact of D2D reception on WAN DL reception, so a common signaling structure may be feasible.

TABLE 6-continued

Proposal 2: For communication, a UE reports the frequency band(s) where it supports D2D
communication reception per each supported band combination. It can be discussed whether the same
capability signaling is also used to report the impact of D2D discovery on WAN DL reception.
  Another issue is related to WAN TX as per the agreement of supporting "Simultaneous D2D RX on CC1
and WAN TX on CC2 from RAN1 perspective." As this feature is related to the frequency separation and UE
implementation, it seems reasonable to inform the network of the band combination in which this simultaneous
operation is supported. To be specific, a UE can indicate a list of {CC1, CC2}, each of which represents the
band combination in which the simultaneous D2D RX on CC1 and WAN TX on CC2 is supported (or such
simultaneous operation is not supported equivalently). Based on this information, the eNB can decide in which
combination of D2D RX and WAN TX UL scheduling restriction is necessary for a UE participating in D2D
reception.
Proposal 3: A UE reports a list of band combinations, each of which represents the support (or no
support) of simultaneous D2D RX and WAN TX.
B. ISSUES IN D2D TRANSMISSIONS
  The network needs to know the set of frequency bands on which a UE can transmit D2D. It can be further
discussed whether a D2D-capable UE can transmit D2D on a carrier frequency if it can transmit WAN in the
same carrier. If the answer is yes, no additional band combination signaling is necessary to indicate the carrier
frequency in which D2D TX is supported.
  In the last meeting, it was agreed to support "simultaneous D2D TX on CC1 and WAN TX on CC2 from
RAN1 perspective." As discussed in [5], the feasibility of such simultaneous TX is dependent of the TX timing
of D2D and WAN. When the transmit timing of the two carriers is the same, it is basically the same as
conventional UL CA from the RF point of view, so no specific issues are expected other than handling the power
limited case which is discussed in [6]. On the other hand, supporting misaligned simultaneous transmission has
been up to the UE capability so far. Multiple timing advance group (TAG) was introduced in Rel-11, and if two
carriers belong to different TAGs in the UE capability, the UE can support simultaneous transmissions as far as
the timing misalignment is not greater than 32.47 us. If UE is not able to support misaligned transmissions of
WAN UL in the two carriers, the maximum supported timing misalignment is zero for the two carriers and it can
be assumed that simultaneous TX of D2D and WAN is not supported with misaligned timing. To generalize this,
it can be assumed that, for a given combination of two carriers, there is an upper bound and the UE can support
simultaneous transmissions if the timing misalignment is not greater than the upper bound.
  As an effort to minimize the related specification work, it can be the baseline to reuse the existing UE
capability for the indication of D2D TX capability. In other words, a UE can transmit WAN in CC1 and CC2, it
can transmit D2D in CC1 as long as the timing difference from the WAN TX in CC2 does not exceed the upper
bound in the capability of the UE.
Proposal 4: As the baseline, it is assumed that a UE supports simultaneous TX of D2D on a carrier and
WAN UL on another carrier if the two carriers belong to the supported band combination for WAN TX
and the timing difference is less than the upper bound in its capability.

Therefore, in order to minimize DL subframe loss, UE-specific controllability on the DL gap for discovery is needed.

When it is assumed that the DL gap is controlled by the eNB, it should be determined whether a DL gap for a specific resource pool and/or a specific cell is to be configured. The UE may not be interested in receiving discovery transmitted in a pool with a specific usage index. In addition, due to the distance from the cell, it may not be possible to receive discovery transmitted from a specific neighbor cell.

Thus, according to the present invention, in relation to the DL gap configuration, the eNB may control the DL gap configuration in a pool-specific/neighbor-cell-specific manner.

Hereinafter, a method for performing a DL WAN operation in a DL gap by a UE having a single RX chain will be described. For example, when the reception timing of the PHICH falls in the DL gap, the UE may assume that the PHICH is ACK and report the PHICH to a higher layer thereof, in order to prevent unintentional PUSCH retransmission.

Moreover, if a CSI reference resource (e.g., subframe #n) related to the CSI report falls in the DL gap, the CSI reference resource may be replaced by the latest valid DL subframe (not positioned in the DL gap) before subframe #n. As another example, in this case, the UE may be defined to report a predefined CSI value. In addition, an operation related to a DRX counter may be defined. For example, the UE may maintain (or perform) DRX counting even in the DL gap since as it can receive the PDCCH in another serving cell (i.e., another aggregation carrier) in which the UE does not receive D2D discovery.

<Method #4>

When the INV_DL SF(s) are configured according to Method #1/Method #2/Method #3 described above, it may be defined that the SRXCH_D2D RX UE performs WAN communication according to the configuration of at least a part (i.e., a part or all) of Examples 4-1 to 4-3 given below.

Example 4-1

For example, if an interference measurement resource (IMR) related to (periodic/aperiodic) calculation/derivation of CSI information reported at a specific time is positioned in the INV_DL SF, the SRXCH_D2D RX UE may be configured to assume that the IMR is invalid. Here, the CSI report may be configured to be performed/calculated using the IMR positioned in the nearest (or latest) non-INV_DL SF before the corresponding INV_DL SF or configured to be omitted, or CSI information of a predefined specific value (e.g., OOR (out-of-range)) may be configured to be reported.

For example, if a CSI reference resource related to CSI information calculation/derivation (periodic/non-periodic) reported at a certain point in time is in INV_DL SF, the SRXCH_D2D RX UE may be configured to assume that the CSI reference resource is invalid. Here, this CSI report may be configured to be performed/calculated (re)using/(re-)assuming, as the CSI reference resource, a DL SF which is a non-INV_DL SF and valid DL SF at the nearest (or latest) time before the corresponding INV_DL SF, or configured to be omitted, or the CSI of a predefined specific value (e.g., OOR) may be configured to be reported.

In addition, for example, applying Example 4-1 described above may be interpreted as meaning that the INV_DL SF is not used for CSI measurement. Here, use in CSI measurement means at least one of desired signal measurement and/or interference measurement. As another example, WAN communication related CSI measurement operation, not the D2D signal reception operation, may be configured to be performed in the INV_DL SF. As another example, the INV_DL SF may be configured not to be used for RRM and/or RLM.

Example 4-2

When Example 4-1 described above is applied, a valid CSI reference resource related to (periodic/aperiodic) calculation/derivation of CSI information reported at a specific time may be configured to be re-discovered only in a predefined or pre-signaled time window (hereinafter, "WIN_SIZE"). Here, such time window configuration may attenuate reporting of excessive outdated CSI information.

As a specific example, if SF #(R-4), which is a CSI reference resource related to (periodic/aperiodic) calculation/derivation of CSI information reported in SF #R, is an INV_DL SF, a CSI reference resource which is at the nearest (or latest) time before SF #(R-4) and is a non-INV_DL SF and valid DL SF is re-discovered only in the region from SF #(R-4-1) to SF #(R-4-WIN_SIZE) according to the configuration/assumption described above.

As another example, a valid IMR related to (periodic/aperiodic) calculation of CSI information reported at a specific time may be configured to be rediscovered only within a predefined or pre-signaled time window. For example, if SF #(R-5) in which an IMR related to (periodic/aperiodic) calculation/derivation of CSI information reported in SF #R is positioned is an INV_DL SF, an IMR which is at the nearest (or latest) time before SF #(R-5) that satisfies the condition that the IMR shall be positioned in the non-INV_DL SF is rediscovered only within the range from SF #(R-5-1) to SF #(R-5-WIN_SIZE).

In addition, when Example 4-2 described above is applied, if a valid CSI reference resource and/or a valid IMR are not present or not reselected in a predefined or pre-signaled time window based rediscovery region, the CSI report may be omitted or CSI information of a predefined specific value (e.g., OOR) may be reported.

Example 4-3

For example, if D2D communication and the dynamic change of usage of a radio resource (i.e., "EIMTA MODE") are simultaneously configured for UE #Z of a single RX chain, and a subframe related to monitoring (or reception) of an indicator (i.e., "EIMTA DCI") related to dynamic change of usage of a radio resource is configured as an INV_DL SF, UE #Z may be configured not to perform EIMTA DCI monitoring (or reception) in the corresponding INV_DL SF. As another example, the UE may be configured to perform EIMTA DCI monitoring (or reception) instead of D2D signal reception in the INV_DL SF.

As another example, as shown in Table 3, reception of a predefined specific WAN downlink signal is prioritized over at least one of i) receiving a (serving-cell/neighbor-cell related) D2D signal, ii) receiving a (serving-cell/neighbor-cell related) discovery signal, and iii) receiving (serving-cell/neighbor-cell) D2DSS(s) associated with the (serving-cell/neighbor-cell) D2D signal resource pool(s). Here, the WAN downlink signal may be defined as paging (and/or SIB).

When this definition is applied, if the D2D UE needs to receive a paging signal (and/or SIB)(SF #N) in the midst of performing one of a discovery signal reception operation (neighbor-cell/serving-cell) in a (neighbor-cell/serving-cell) D2DSS reception operation associated with the (neighbor-cell/serving-cell) D2D signal resource pool, the D2D UE may be configured: i) not to perform the discovery signal reception operation in SF(s) in the (neighbor/serving-cell) D2D signal resource pool at least partially (i.e., partially or fully) overlapping the region from SF #N-1 to SF #N+1 (or SF #N) in the time resource region; and (ii) not to perform the D2DSS reception operation in (neighbor/serving) cell D2DSS SF(s) (or D2DSS resource) at least partially (i.e., partially or fully) overlapping the region from SF #N-1 to SF #N+1 (or SF #N) in the time resource region (i.e., configured to (at least) receive a paging signal (and/or SIB) in SF #N).

For example, in SF #N (or the region from SF #N-1 to SF #N+1), i) at least one of reception of PHICH (which was not received/valid in INV_DL SF(s) due to application of Example #4), reception of EIMTA DCI, reception of a random access response, reception of MESSAGE 4 (in a contention-based random access procedure) (i.e., a contention resolution message), and reception of PHICH related to (re)transmission of MESSAGE 3 (e.g., PUSCH) (in a contention-based random access procedure) may be configured to be performed, and/or ii) at least one of the IMR resource and the CSI reference resource in SF #N (or the region from SF #N-1 to SF #N+1) may be assumed to be valid. Here, this configuration may be applied only to the SRXCH_D2D RX UE.

In another example, in SF #N (or the region from SF #N-1 to SF #N+1), i) reception of PHICH, reception of EIMTA DCI, reception of a random access response, reception of MESSAGE 4 (in a contention-based random access procedure) (i.e., a contention resolution message), and reception of PHICH related to (re)transmission of MESSAGE 3 (e.g., PUSCH) (in a contention-based random access procedure) may be configured not to be allowed, and/or ii) the IMR resource and the CSI reference resource in SF #N (or the region from SF #N-1 to SF #N+1) may be assumed to be invalid.

Table 7 below shows an example of the capability/operation of simultaneous reception of a D2D signal (i.e., UL spectrum)/a WAN downlink signal (i.e., DL spectrum) of the D2D UE in the FDD environment.

TABLE 7

For communication, UE is able to receive simultaneously on the DL and UL spectrum of FDD carriers supporting D2D
For discovery, UE may not be able to receive simultaneously on the DL and UL spectrum of FDD carriers supporting D2D
Send LS to RAN2, RAN4, and SA2
    RAN2:
        To investigate impact on UE capability signalling of restriction on cellular
           operation when D2D is operated
        [Public safety UEs are assumed to be able to simultaneously perform cellular
           on DL carrier and D2D on associated UL carrier for FDD band]
        For discovery, non-public safety UE may not be able to receive
           simultaneously on the DL and UL spectrum of FDD carriers supporting D2D
        There is no simultaneous operation of CA and D2D required for Rel-12 D2D
           communication if we assume 2 DL CA capable UEs TABLE 7-continued RAN4:
    RAN1 asks feasibility and implication of simultaneous reception of cellular on
        DL spectrum and D2D associated UL spectrum for FDD band
    RAN1 asks feasibility and implication of single receiver chain switching
        between cellular spectrum and D2D reception associated UL spectrum for
        FDD band
SA2:
    [Public safety UEs are assumed to be able to simultaneously perform cellular
    on one carrier and D2D on another carrier]

<Method #5>

The INV_DL SF(s) configured based on at least a part (i.e., a part or all) of the above-described proposed methods (e.g., Method #1, Method #2, Method #3, Method #4) may not be configured if at least a part (i.e. a part or all) of the following conditions is not satisfied. Here, Method #5 may be configured to be applied only when the D2D operation is performed in the FDD system environment (DL and UL spectrum of FDD carriers supporting D2D).

Example 5-1

For example, if the D2D UE is receiving D2D communication and D2D discovery simultaneously on the same (UL) carrier (or (UL) spectrum), INV_DL SF(s) may not be configured. This is because the D2D UE is already provided or equipped with a D2D receiver for D2D communication reception according to "FOR COMMUNICATION, RAN1 ASSUMES THAT UE IS ABLE TO RECEIVE SIMULTANEOUSLY ON THE DL AND UL SPECTRUM OF FDD CARRIERS SUPPORTING D2D" stated in Table.

In another example, in the case where the D2D UE is capable of signaling whether INV_DL SF(s) configuration is necessary, if the D2D UE signals that INV_DL SF(s) configuration is unnecessary, the INV_DL SF(s) may not be configured.

In another example, in the case where the D2D UE is capable of signaling whether a DL gap is necessary, if the D2D UE signals that configuration of the DL gap is unnecessary, the DL gap may not be configured.

Example 5-2

For example, if the D2D UE is not capable of supporting D2DSS (TX/RX), the D2DSS-related INV_DL SF(s) configured based on at least one of Method #1, Method #2, Method #3 and Method #4 described above may not be configured. Herein, if the UE capability is signaled or reported, the eNB/network may announce, through a predefined signal (e.g., dedicated (RRC) signaling, SIB), whether or not the D2DSS related INV_DL SF(s) are configured.

Example 5-3

For example, if i) a D2DSS measurement value associated with a pre-configured or pre-signaled neighbor-cell discovery pool is less than or equal to a preset or pre-signaled threshold value (i.e., it is determined that the neighbor cell is far from the serving cell/D2D RX UE), and/or ii) the (modified) RSRP value (or (modified) RSRQ) of the neighbor cell is less than or equal to a preset or signaled threshold (i.e., it is determined that the neighbor cell is far from the serving cell (or D2D RX UE)), the D2DSS related INV_DL SF(s) (or DL gap) and/or discovery pool related INV_DL SF(s) (or DL gap) configured according to at least a part (i.e., a part or all) of the above-descried proposed methods (e.g., Method #1 and/or Method #2 and/or Method #3 and/or Method #4) may be defined not to be configured.

In another example, if i) a D2DSS measurement value associated with a pre-configured or pre-signaled neighbor-cell discovery pool is greater than or equal to a preset or pre-signaled threshold value, and/or ii) the (modified) RSRP value (or (modified) RSRQ) of the neighbor cell is greater than or equal to a preset or signaled threshold, the D2DSS related INV_DL SF(s) (or DL gap) and/or discovery pool related INV_DL SF(s) (or DL gap) configured according to at least a part (i.e., a part or all) of the above-descried proposed methods (e.g., Method #1 and/or Method #2 and/or Method #3 and/or Method #4) may be defined not to be configured.

Here, for example, if the D2D UE reports, to the serving cell, at least one of i) information about whether the (neighbor-cell) D2DSS measurement value associated with a pre-configured or pre-signaled neighbor-cell discovery pool is less than or equal to a preset or signaled threshold value (neighbor-cell), ii) information about whether the (neighbor-cell) D2DSS measurement value associated with the pre-configured or pre-signaled neighbor-cell discovery pool is greater than or equal to a preset or pre-signaled threshold value (neighbor-cell), iii) information about the (neighbor-cell) D2DSS measurement value associated with the pre-configured or pre-signaled neighbor-cell discovery pool, iv) information about whether the (modified) RSRP value (or (modified) RSRQ value) of the corresponding neighbor cell is less than or equal to a preset or signaled threshold, v) information about whether the (modified) RSRP value (or (modified) RSRQ value) of the corresponding neighbor cell is greater than or equal to a preset or pre-signaled threshold, and vi) information about the (modified) RSRP value (or (modified) RSRQ value) of the corresponding neighbor cell, the serving cell receiving the corresponding information may announce whether the D2DSS related INV_DL SF(s) (or DL gap) and/or discovery pool related INV_DL SF(s) (or DL gap) is configured through a predefined signal (e.g., dedicated (RRC) signaling, SIB) in a UE-specific or cell-specific manner.

For example, the eNB (or serving cell) may UE-specifically or cell-specifically designate D2DSS SF(s) and/or discovery (pool) SF(s) of (neighbor) cell(s) for which INV_DL SF(s) (or DL gap) are to be configured.

As another example of the proposed method, the INV_DL SF(s) (or DL gap) described above may be defined to be configured only in a DL CC (or DL cell) associated/paired with a (discovery) pool of a usage index desired by the UE, or the eNB may be configured to configure the INV_DL SF(s) (or DL gap) only in (a DL CC (or DL cell) associated/paired with) a (discovery) pool (or specific (discovery) pool) of a specific usage index.

As another example of the proposed scheme, for a cell for which synchronization error information (related to reception of a discovery signal and/or a D2DSS (associated with the corresponding discovery pool)) of w1 is signaled, INV_DL SF(s) (or DL gap(s)) may not be configured, and at least one of i) the discovery signal reception operation or ii) the D2DSS reception operation (associated with the corresponding discovery pool) may be performed in a best effort manner.

As another example of the proposed scheme, for a cell for which synchronization error information (related to reception of a discovery signal and/or a D2DSS (associated with the corresponding discovery pool)) of w1 is signaled, INV_DL SF(s) (or DL gap) may be configured as is done for (or in the same manner as for) a cell for which synchronization error information (related to reception of a discovery signal and/or a D2DSS (associated with the corresponding discovery pool)) of w2 is signaled although such configuration results in performance degradation.

Here, for example, for the cell for which synchronization error information related to reception of a discovery signal (and/or a D2DSS (associated with the corresponding discovery pool)) is signaled, i) DL SF(s) at least partially (i.e., partially or fully) overlapping, in the time resource region, the region from the starting SF-CEILING(w1)−1 in the neighbor-cell discovery pool to the (ending) SF+CEILING (w1)+1 in the neighbor-cell discovery pool may be assumed to be INV_DL SF(s) (or DL gap), and/or ii) DL SF(s) at least partially (i.e., partially or fully) overlapping the region from SF #N-CEILING(w1)−1 to SF #N+CEILING(w1)+1 in the time resource region may be assumed to be INV_DL SF(s) (when, for example, a neighbor-cell D2DSS resource is configured in serving-cell SF #N), as described in Example 1-1 of Method #1.

On the other hand, for example, for a cell for which synchronization error information of w2 related to reception of a discovery signal (and/or a D2DSS (associated with the corresponding discovery pool)) is signaled, DL SF(s) at least partially (i.e., partially or fully) overlapping, in the time resource region, the region from the starting SF−1 in the neighbor-cell discovery pool to the ending SF+1 in the neighbor-cell discovery pool may be assumed to be INV_DL SF(s) (or DL gap), and/or ii) DL SF(s) at least partially (i.e., partially or fully) overlapping the region from SF #N−1 to SF #N+1 in the time resource region may be assumed to be INV_DL SF(s) (when, for example, a neighbor-cell D2DSS resource is configured in serving-cell SF #N), as described in Example 1-1 of Method #1.

Presented in the following description are methods for efficiently configuring the INV_DL SF(s) (or DL gap(s)) described above when the D2D RX UE (hereinafter, "SRXCH_D2D RX UE") of a single RX chain or the D2D/cellular shared RX chain UE (hereinafter, "SHRXCH_D2D RX UE") performs i) a D2D discovery signal reception operation on a different (UL) carrier at an inter-frequency or ii) a D2D discovery signal reception operation on a different PLMN (UL) carrier based on an inter-PLMN. Here, the SHRXCH_D2D RX UE (or SRXCH_D2D RX UE) may be interpreted as a UE that switches or shares its (small number of or one) RX chain between D2D RX use and WAN DL RX use. In addition, the following methods may be applied not only in a situation where carrier aggregation (CA) is applied but also in a situation where a single cell is configured.

Table 8 below shows the WAN DL signal reception operation (i.e., INV_DL SF(s) (or DL gap(s)) configuration) assumed by the SHRXCH_D2D RX UE (or SRXCH_D2D RX UE) in receiving a D2D discovery signal.

TABLE 8

For FDD carriers:
A UE with a shared D2D/cellular Rx chain (or a UE with a single Rx chain) and is receiving D2D discovery signals on an UL carrier is not expected to read DL signals on the DL carrier paired to such UL carrier during the subframes belonging to the D2D discovery pools on that UL carrier as well as one subframe preceding and following these subframes.

<Method #6>

If the UE (e.g., the D2D RX UE of a single RX chain or the SRXCH_D2D RX UE (e.g., the D2D RX UE of a shared D2D/cellular RX chain)) performs i) a D2D discovery signal reception operation on a different (UL) carrier at an inter-frequency or ii) a D2D discovery signal reception operation on a different PLMN (UL) carrier based on an inter-PLMN, the INV_DL SF(s) (or DL gap(s)) described above may be configured based on at least some (i.e., some or all) of the rules/configurations disclosed in Examples 6-1 to 6-8 given below. Here, for example, the SHRXCH_D2D RX UE (or SRXCH_D2D RX UE) may be interpreted as a UE that switches (or shares) its (small number of or one) RX chain between D2D RX use and WAN DL RX use. In addition, for example, the following methods may be applied not only in a situation where carrier aggregation (CA) is applied but also in a situation where a single cell is configured.

Here, for simplicity of description of the proposed methods, it is assumed that the SHRXCH_D2D RX UE (or the SRXCH_D2D RX UE) performs the D2D discovery signal reception operation on a different (UL) carrier (or a different PLMN (UL) carrier) (hereinafter, "DIFF_CC") at an inter-frequency in a situation where two cells (i.e., primary cell #A (i.e., DL CC #A, UL CC #A), secondary cell #B (i.e., DL CC #B, UL CC #B)) are configured.

Further, the different (UL) carrier at the inter-frequency may be designated as an inter-frequency UL CC from the perspective of UL CC #A (SCELL #B (UL CC #B/DL CC #B) of PCELL #A or from the perspective of UL CC#B (PCELL#A (UL CC #A/DL CC #A)) of SCELL #B.

In addition, for example, Method #6 may be applied even in the case where the D2D discovery signal reception operation is performed on DIFF_CC in a situation where three cells (or one cell) are configured. For example, Method #6 may be applied even in the case where the DIFF_CC is configured for a serving cell and/or a neighbor cell.

Example 6-1

When the SHRXCH_D2D RX UE (or the SRXCH_D2D RX UE) performs the D2D discovery signal reception operation on the DIFF_CC, the UE may be defined to configure INV_DL SF(s) (or DL gap(s)) on all of DL CC(s) (e.g., DL CC #A and DL CC #B) thereof configured with the CA technique. Here, application of this configuration/rule may be interpreted as meaning that whether the INV_DL SF(s) (or DL gap(s)) are configured on a specific (serving-cell related) DL CC is determined based on whether or not the D2D discovery signal reception operation is performed on the DIFF_CC rather than on whether or not the specific (serving-cell related) DL CC is paired with DIFF_CC.

Example 6-2

When the SHRXCH_D2D RX UE (or the SRXCH_D2D RX UE) performs the D2D discovery signal reception operation on the DIFF_CC, the UE may be defined to INV_DL SF(s) (or DL gap(s)) only on predefined or pre-signaled serving-cell related DL CC(s) among the DL CC(s) (or serving-cell(s)) thereof configured with the CA technique.

Here, i) (virtual) pairing (PAIRING) may be interpreted as being specified between DL CC(s) on which INV_DL SF(s)

(or DL gap(s)) are configured and DIFF_CC, or ii) the DL CC(s) on which INV_DL SF(s) (or DL gap(s)) are configured may be interpreted as (virtually) paired DL CC(s) of DIFF_CC.

When the SHRXCH_D2D RX UE (or the SRXCH_D2D RX UE) performs the D2D discovery signal reception operation on the DIFF_CC, information about i) the DL CC(s) on which INV_DL SF(s) (or DL gap(s)) are configured or ii) the serving cell(s) may be signaled/defined in pair/combination of "information about the (UL) CC (or serving-cell) on which a D2D discovery pool is configured" and "information about the DL CC(s) (or serving-cell(s)) on which INV_DL SF(s) (or DL gap(s)) are configured when the D2D discovery signal reception operation is performed on a (UL) CC (or serving-cell)."

Example 6-3

When the SHRXCH RX UE (or SRXCH_D2D RX UE) performs a D2D discovery signal reception operation on the DIFF_CC, it may be defined that the UE configures INV_DL SF(s) (or DL gap(s)) only on the DL CC (e.g., DL CC #A) of the PCELL among the DL CC(s) of the UE configured with the CA technique. Here, application of this method may be interpreted as meaning that whether the INV_DL SF(s) (or DL gap(s)) are configured on the DL CC of the PCELL is determined based on whether or not the D2D discovery signal reception operation is performed on the DIFF_CC rather than on whether or not the D2D discovery signal reception operation is performed on the paired UL CC of the PCELL (e.g., UL CC #A).

Example 6-4

When the SHRXCH_D2D RX UE (or the SRXCH_D2D RX UE) performs the D2D discovery signal reception operation on the DIFF_CC, the UE may be defined to configure INV_DL SF(s) (or DL gap(s)) on DL CC(s) (e.g., DL CC #B) of the SCELL(s) excluding the PCELL among the DL CC(s) thereof configured with the CA technique. Here, application of this method may be interpreted as meaning that whether the INV_DL SF(s) (or DL gap(s)) are configured on the DL CC(s) (e.g., DL CC#B) of the SCELL(s) is determined based on whether or not the D2D discovery signal reception operation is performed on the DIFF_CC rather than on whether or not the D2D discovery signal reception operation is performed on the paired UL CC(s) of the SCELL(s) (e.g., UL CC #B).

Example 6-5

In the examples (e.g., Example 6-1, Example 6-2, Example 6-3, Example 6-4) described above, if synchronization error information related to reception of the discovery pool and/or D2DSS (associated with the discovery pool) on the DIFF_CC is signaled as w1, i) the DL SF(s) of DL CC(s) which at least partially (i.e., partially or fully) overlap, in the time resource region, the region from the starting SF-CEILING(w1)-1 in the DIFF_CC discovery pool to the ending SF+CEILING(w1)+1 in the DIFF_CC discovery pool and are selected or specified based on the examples described above are assumed to be INV_DL SF(s) (or DL gap), and/or ii) the DL SF(s) of DL CC(s) which at least partially (i.e., partially or fully) overlap the region from SF #N-CEILING(w1)-1 to SF #N+CEILING(w1)+1 in the time resource region and are selected or specified based on the examples described above are assumed to be INV_DL SF(s) (or DL gap) (i.e., when a DIFF_CC D2DSS resource is configured in serving-cell SF #N). Here, this configuration/rule may be defined to be applied only when the DIFF_CC is a neighbor-cell (and/or serving-cell and/or different PLMN (UL)) carrier.

In another example, if synchronization error information related to reception of the discovery pool and/or D2DSS (associated with the discovery pool) on the DIFF_CC is signaled as w2, i) the DL SF(s) of DL CC(s) which at least partially (i.e., partially or fully) overlap, in the time resource region, the region from the starting SF-1 in the DIFF_CC discovery pool to the ending SF+1 in the DIFF_CC discovery pool and are selected (or specified) based on the examples described above are assumed to be INV_DL SF(s) (or DL gap), and/or ii) the DL SF(s) of DL CC(s) which at least partially (i.e., partially or fully) overlap the region from SF #N-1 to SF #N+1 in the time resource region and are selected or specified based on the examples described above are assumed to be INV_DL SF(s) (or DL gap) (i.e., when a DIFF_CC D2DSS resource is configured in serving-cell SF #N). Here, this rule may be defined to be applied only when the DIFF_CC is a neighbor-cell (and/or serving-cell and/or different PLMN (UL)) carrier.

Example 6-6

In the examples (e.g., Example 6-1, Example 6-2, Example 6-3, Example 6-4) described above, i) the DL SF(s) of DL CC(s) which at least partially (i.e., partially or fully) overlap, in the time resource region, the region from the starting SF-1 in the DIFF_CC discovery pool to the ending SF+1 in the DIFF_CC discovery pool and are selected or specified based on the examples described above are assumed to be INV_DL SF(s) (or DL gap), and/or ii) the DL SF(s) of DL CC(s) which at least partially (i.e., partially or fully) overlap the region from SF #N-1 to SF #N+1 in the time resource region and are selected or specified based on the examples described above are assumed to be INV_DL SF(s) (or DL gap) (i.e., when a DIFF_CC D2DSS resource is configured in serving-cell SF #N). Here, this configuration may be defined to be applied only when the DIFF_CC is a serving-cell (and/or neighbor-cell and/or different PLMN (UL)) carrier.

Example 6-7

The serving eNB/D2D UE may be configured or defined to deliver information about at least one of i) whether or not (some or all of) the examples (e.g., Example 6-1, Example 6-2, Example 6-3, Example 6-4, Example 6-5, Example 6-6) described above are applied, ii) a (serving) cell to which example(s) are applied, iii) whether or not INV_DL SF(s) (or DL gap(s)) are configured due to the D2D discovery signal reception operation on a different (UL) carrier at an inter-frequency, or iv) whether or not INV_DL SF(s) (or DL gap(s)) are configured due to the D2D discovery signal reception operation on a different PLMN (UL) carrier to (other) D2D UEs through a predefined signal (e.g., SIB, (dedicated) RRC, PD2DSCH).

As another example, the example(s) (e.g., Example 6-1, Example 6-2, Example 6-3, Example 6-4, Example 6-5, Example 6-6) described above may be applied even when the SHRXCH_D2D RX UE (or SRXCH_D2D RX UE) receives a D2D communication signal (e.g., SA, D2D DATA) on the DIFF_CC.

As another example, in the example(s) (e.g., Example 6-1, Example 6-2, Example 6-3, Example 6-4, Example 6-5, Example 6-6) described above, if there is a (paired) DL CC of the DIFF_CC (e.g., when D2D discovery signal reception is performed on a different (UL) carrier at an inter-frequency), and the SHRXCH_D2D RX UE (or SRXCH_D2D RX UE) performs the D2D discovery signal reception operation on the DIFF_CC, INV_DL SF(s) (or DL gap(s)) may be defined to be configured on the (paired) DL CC i) any time or ii) only when the INV_DL SF(s) (or DL gap(s)) configuration is enabled.

Example 6-8

When the SHRXCH_D2D RX UE (or SRXCH_D2D RX UE) performs the D2D discovery signal reception operation on the DIFF_CC, the configured INV_DL SF(s) (or DL gap(s)) information may be designated or signaled in the form of a bitmap. Here, a (serving) cell to which the information is actually applied may be announced from the serving eNB (or D2D UE) to (another) D2D UE through an additional predefined signal (e.g., SIB, (dedicated) RRC, PD2DSCH), may be preconfigured, or may be selected based on at least a (predefined or pre-signaled) part (part or all) of the rules (e.g., Example 6-1, Example 6-2, Example 6-3, Example 6-4, Example 6-5, Example 6-6, Example 6-7) described above.

<Method #7>

When INV_DL SF(s) are configured according to at least a part (i.e., a part or all) of the methods (e.g., Method #1, Method #2, Method #3, Method #4, Method #5) described above, the DRX operation may be defined to be performed according to at least a part (i.e., a part or all) of the following configurations.

Regarding the present invention, which will be described in detail below, DRX configuration/operation of the conventional DRX configuration/operation (of a UE) is performed as shown in Table 9.

TABLE 9

| Discontinuous Reception (DRX) |
| --- |
| Abbreviations [1] |

Active Time
Time related to DRX operation, during which the UE monitors the PDCCH in PDCCH-subframes.
DRX Cycle
Specifies the periodic repetition of the On Duration followed by a possible period of inactivity.
drx-InactivityTimer
Specifies the number of consecutive PDCCH-subframe(s) after successfully decoding a PDCCH indicating an initial UL or DL user data transmission for this UE.
drx-RetransmissionTimer
Specifies the maximum number of consecutive PDCCH-subframe(s) for as soon as a DL retransmission is expected by the UE.
drxShortCycleTimer
Specifies the number of consecutive subframe(s) the UE shall follow the Short DRX cycle.
drxStartOffset
Specifies the subframe where the DRX Cycle starts.
HARQ RTT Timer
This parameter specifies the minimum amount of subframe(s) before a DL HARQ retransmission is expected by the UE.
onDurationTimer
Specifies the number of consecutive PDCCH-subframe(s) at the beginning of a DRX Cycle.
PDCCH-subframe
Refers to a subframe with PDCCH or, for an RN with R-PDCCH configured and not suspended, to a subframe with R-PDCCH. For FDD UE operation, this represents any subframe; for TDD, only downlink subframes and subframes including DwPTS. For RNs with an RN subframe configuration configured and not suspended, in its communication with the E-UTRAN, this represents all downlink subframes configured for RN communication with the E-UTRAN.
HARQ RTT Timer
For FDD the HARQ RTT Timer is set to 8 subframes. For TDD the HARQ RTT Timer is set to (k + 4) subframes, where k is the interval between the downlink transmission and the transmission of associated HARQ feedback, as indicated in Table 10.1.3.1-1 of [2].
The UE may be configured by RRC with a DRX functionality that controls the UE's PDCCH monitoring activity for the UE's C-RNTI, TPC-PUCCH-RNTI, TPC-PUSCH-RNTI, Semi-Persistent Scheduling C-RNTI (if configured) and eIMTA-RNTI (if configured). When in RRC_CONNECTED, if DRX is configured, the UE is allowed to monitor the PDCCH discontinuously using the DRX operation specified in this subclause [1]; otherwise the UE monitors the PDCCH continuously. When using DRX operation, the UE shall also monitor PDCCH according to requirements found in other subclauses of this specification [1]. RRC controls DRX operation by configuring the timers onDurationTimer, drx-InactivityTimer, drx-RetransmissionTimer (one per DL HARQ process except for the broadcast process), the longDRX-Cycle, the value of the drxStartOffset and optionally the drxShortCycle Timer and shortDRX-Cycle. A HARQ RTT timer per DL HARQ process (except for the broadcast process) is also defined (see subclause 7.7).
When a DRX cycle is configured, the Active Time includes the time while:
    onDurationTimer or drx-InactivityTimer or drx-RetransmissionTimer or mac-ContentionResolutionTimer (as described in subclause 5.1.5 [1]) is running; or
    a Scheduling Request is sent on PUCCH and is pending (as described in subclause 5.4.4 [1]); or
    an uplink grant for a pending HARQ retransmission can occur and there is data in the corresponding HARQ buffer; or
    a PDCCH indicating a new transmission addressed to the C-RNTI of the UE has not been received after successful reception of a Random Access Response for the preamble not selected by the UE (as described in subclause 5.1.4 [1]).

TABLE 9-continued

Discontinuous Reception (DRX)

When DRX is configured, the UE shall for each subframe:
  if a HARQ RTT Timer expires in this subframe and the data of the corresponding HARQ process was not
  successfully decoded:
    start the drx-Retransmission Timer for the corresponding HARQ process.
  if a DRX Command MAC control element or a Long DRX Command MAC control element is received:
    stop onDurationTimer;
    stop drx-InactivityTimer.
  if drx-InactivityTimer expires or a DRX Command MAC control element is received in this subframe:
    if the Short DRX cycle is configured:
      start or restart drxShortCycleTimer;
      use the Short DRX Cycle.
    else:
      use the Long DRX cycle.
  if drxShortCycleTimer expires in this subframe:
    use the Long DRX cycle.
  if a Long DRX Command MAC control element is received:
    stop drxShortCycleTimer;
    use the Long DRX cycle.
  If the Short DRX Cycle is used and [(SFN * 10) + subframe number] modulo (shortDRX-Cycle) = (drxStartOffset)
  modulo (shortDRX-Cycle); or
  if the Long DRX Cycle is used and [(SFN * 10) + subframe number] modulo (longDRX-Cycle) = drxStartOffset:
    start onDuration Timer.
  during the Active Time, for a PDCCH-subframe, if the subframe is not required for uplink transmission for half-
  duplex FDD UE operation, if the subframe is not a half-duplex guard subframe [5] and if the subframe in not part
  of a configured measurement gap; or
  during the Active Time, for a subframe other than a PDCCH-subframe and for a UE capable of simultaneous
  reception and transmission in the aggregated cells, if the subframe is a downlink subframe indicated by a valid
  eIMTA L1 signalling for at least one serving cell not configured with schedulingCellId [3] and if the subframe is
  not part of a configured measurement gap; or
  during the Active Time, for a subframe other than a PDCCH-subframe and for a UE not capable of simultaneous
  reception and transmission in the aggregated cells, if the subframe is a downlink subframe indicated by a valid
  eIMTA L1 signalling for the PCell and if the subframe is not part of a configured measurement gap:
    monitor the PDCCH;
    if the PDCCH indicates a DL transmission or if a DL assignment has been configured for this subframe:
      start the HARQ RTT Timer for the corresponding HARQ process;
      stop the drx-Retransmission Timer for the corresponding HARQ process.
    if the PDCCH indicates a new transmission (DL or UL):
      start or restart drx-InactivityTimer.
  in current subframe n, if the UE would not be in Active Time considering grants/assignments/DRX Command
  MAC control elements received and Scheduling Request sent until and including subframe n-5 when evaluating
  all DRX Active Time conditions as specified in this subclause, type-0-triggered SRS [2] shall not be reported.
  if CQI masking (cqi-Mask) is setup by upper layers:
    in current subframe n, if onDurationTimer would not be running considering grants/assignments/DRX
    Command MAC control elements received until and including subframe n-5 when evaluating all DRX Active
    Time conditions as specified in this subclause, CQI/PMI/RI/PTI on PUCCH shall not be reported.
  else:
    in current subframe n, if the UE would not be in Active Time considering grants/assignments/DRX Command
    MAC control elements received and Scheduling Request sent until and including subframe n-5 when
    evaluating all DRX Active Time conditions as specified in this subclause, CQI/PMI/RI/PTI on PUCCH shall
    not be reported.
Regardless of whether the UE is monitoring PDCCH or not, the UE receives and transmits HARQ
feedback and transmits type-1-triggered SRS [2] when such is expected.
[NOTE]: The same active time applies to all activated serving cell(s).
[NOTE]: In case of downlink spatial multiplexing, if a TB is received while the HARQ RTT
Timer is running and the previous transmission of the same TB was received at least N subframes
before the current subframe (where N corresponds to the HARQ RTT Timer), the UE should process
it and restart the HARQ RTT Timer.
MAC-MainConfig [3]
The IE MAC-MainConfig is used to specify the MAC main configuration for signalling and data
radio bearers.

MAC-MainConfig information element

```
--ASN1START
MAC-MainConfig ::=         SEQUENCE {
  ul-SCH-Config              SEQUENCE {
    maxHARQ-Tx                 ENUMERATED {
                                 n1, n2, n3, n4, n5, n6, n7, n8,
                                 n10, n12, n16, n20, n24, n28,
                                 spare2, spare1}      OPTIONAL,    -- Need ON
    periodicBSR-Timer          ENUMERATED {
                                 sf5, sf10, sf16, sf20, sf32, sf40, sf64, sf80,
                                 sf128, sf160, sf320, sf640, sf1280, sf2560,
                                 infinity, spare1}  OPTIONAL,    -- Need ON
    retxBSR-Timer              ENUMERATED {
                                 sf320, sf640, sf1280, sf2560, sf5120,
                                 sf10240, spare2, spare1},
    ttiBundling                BOOLEAN
  }                                                    OPTIONAL,    -- Need ON
```

TABLE 9-continued

| Discontinuous Reception (DRX) |

```
drx-Config                  DRX-Config                       OPTIONAL,       -- Need ON
timeAlignmentTimerDedicated TimeAlignmentTimer,
phr-Config                  CHOICE {
    release                 NULL,
    setup                   SEQUENCE {
        periodicPHR-Timer       ENUMERATED {sf10, sf20, sf50, sf100, sf200,
                                            sf500, sf1000, infinity},
        prohibitPHR-Timer       ENUMERATED {sf0, sf10, sf20, sf50, sf100,
                                            sf200, sf500, sf1000},
        dl-PathlossChange       ENUMERATED {dB1, dB3, dB6, infinity}
    }
}                                                            OPTIONAL,       -- Need ON
...,
[[  sr-ProhibitTimer-r9     INTEGER (0..7)       OPTIONAL -- Need ON
]],
[[  mac-MainConfig-v1020    SEQUENCE {
        sCellDeactivationTimer-r10  ENUMERATED {
                                    rf2, rf4, rf8, rf16, rf132, rf64, rf128,
                                    spare}       OPTIONAL,       -- Need OP
        extendedBSR-Sizes-r10       ENUMERATED {setup}   OPTIONAL,       --Need OR
        extendedPHR-r10             ENUMERATED {setup}   OPTIONAL       --Need OR
    }                                                    OPTIONAL -- Need ON
]],
[[  stag-ToReleaseList-r11  STAG-ToReleaseList-r11   OPTIONAL, -- Need ON
    stag-ToAddModList-r11   STAG-ToAddModList-r11    OPTIONAL, --Need ON
    drx-Config-v1130        DRX-Config-v1130         OPTIONAL -- Cond DRX
]]
}
MAC-MainConfigSCell-r11 ::= SEQUENCE {
    stag-Id-r11             STAG-Id-r11         OPTIONAL,    --Need OP
    ...
}
DRX-Config :=               CHOICE {
    release                 NULL,
    setup                   SEQUENCE {
        onDurationTimer         ENUMERATED {
                                    psf1, psf2, psf3, psf4, psf5, psf6,
                                    psf8, psf10, psf20, psf30, psf40,
                                    psf50, psf60, psf80, psf100,
                                    psf200},
        drx-InactivityTimer     ENUMERATED {
                                    psf1, psf2, psf3, psf4, psf5, psf6,
                                    psf8, psf10, psf20, psf30, psf40,
                                    psf50, psf60, psf80, psf100,
                                    psf200, psf300, psf500, psf750,
                                    psf1280, psf1920, psf2560, psf0-v1020,
                                    spare9, spare8, spare7, spare6,
                                    spare5, spare4, spare3, spare2,
                                    spare1},
        drx-RetransmissionTimer ENUMERATED {
                                    psf1, psf2, psf4, psf6, psf8, psf16,
                                    psf24, psf33},
        longDRX-CycleStartOffset CHOICE {
            sf10                    INTEGER(0..9),
            sf20                    INTEGER(0..19),
            sf32                    INTEGER(0..31),
            sf40                    INTEGER(0..39),
            sf64                    INTEGER(0..63),
            sf80                    INTEGER(0..79),
            sf128                   INTEGER(0..127),
            sf160                   INTEGER(0..159),
            sf256                   INTEGER(0..255),
            sf320                   INTEGER(0..319),
            sf512                   INTEGER(0..511),
            sf640                   INTEGER(0..639),
            sf1024                  INTEGER(0..1023),
            sf1280                  INTEGER(0..1279),
            sf2048                  INTEGER(0..2047),
            sf2560                  INTEGER(0..2559)
        },
        shortDRX                SEQUENCE {
            shortDRX-Cycle          ENUMERATED {
                                        sf2, sf5, sf8, sf10, sf16, sf20,
                                        sf32, sf40, sf64, sf80, sf128, sf160,
                                        sf256, sf320, sf512, sf640},
```

TABLE 9-continued

Discontinuous Reception (DRX)

```
                drxShortCycleTimer                      INTEGER (1..16)
            }       OPTIONAL -- Need OR
        }
    }
}
DRX-Config-v1130 ::= SEQUENCE {
        drx-RetransmissionTimer-v1130 ENUMERATED {psf0-v1130} OPTIONAL, --Need OR
        longDRX-CycleStartOffset-v1130 CHOICE {
            sf60-v1130                          INTEGER(0..59),
            sf70-v1130                          INTEGER(0..69)
        }                                                           OPTIONAL --Need OR
        shortDRX-Cycle-v1130 ENUMERATED {sf4-v1130} OPTIONAL --Need OR
}
STAG-ToReleaseList-r11 ::= SEQUENCE (SIZE (1..maxSTAG-r11)) OF STAG-Id-r11
STAG-ToAddModList-r11 ::=    SEQUENCE (SIZE (1..maxSTAG-r11)) OF STAG-ToAddMod-r11
STAG-ToAddMod-r11 ::=        SEQUENCE {
        stag-Id-r11                     STAG-Id-r11,
        timeAlignmentTimerSTAG-r11      TimeAlignmentTimer,
        ...
}
STAG-Id-r11 ::=                 INTEGER ( 1..maxSTAG-r11)
--ASN1STOP
```

MAC-MainConfig field descriptions [3]

dl-PathlossChange
DL Pathloss Change and the change of the required power backoff due to power management (as allowed by P-MPRc [4]) for PHR reporting in TS 36.321 [1]. Value in dB. Value dB1 corresponds to 1 dB, dB3 corresponds to 3 dB and so on. The same value applies for each serving cell (although the associated functionality is performed independently for each cell).
drx-Config
Used to configure DRX as specified in TS 36.321 [1]. E-UTRAN configures the values in DRX-Config-v1130 only if the UE indicates support for IDC indication.
drx-Inactivity Timer
Timer for DRX in TS 36.321 [1]. Value in number of PDCCH sub-frames. Value psf1 corresponds to 1 PDCCH sub-frame, psf2 corresponds to 2 PDCCH sub-frames and so on.
drx-Retransmission Timer
Timer for DRX in TS 36.321 [1]. Value in number of PDCCH sub-frames. Value psf1 corresponds to 1 PDCCH sub-frame, psf2 corresponds to 2 PDCCH sub-frames and so on. In case drx-RetransmissionTimer-v1130 is signalled, the UE shall ignore drx-RetransmissionTimer (i.e. without suffix).
drxShortCycleTimer
Timer for DRX in TS 36.321 [1]. Value in multiples of shortDRX-Cycle. A value of 1 corresponds to shortDRX-Cycle, a value of 2 corresponds to 2 * shortDRX-Cycle and so on.
extendedBSR-Sizes
If value setup is configured, the BSR index indicates extended BSR size levels as defined in TS 36.321 [1, Table 6.1.3.1-2].
extendedPHR
Indicates if power headroom shall be reported using the Extended Power Headroom Report MAC control element defined in TS 36.321 [1] (value setup). Otherwise the power headroom shall be reported using the Power Headroom Report MAC control element defined in TS 36.321 [1]. E-UTRAN always configures the value setup if more than one Serving Cell with uplink is configured.
longDRX-CycleStartOffset
longDRX-Cycle and drxStartOffset in TS 36.321 [1]. The value of longDRX-Cycle is in number of sub-frames. Value sf10 corresponds to 10 sub-frames, sf20 corresponds to 20 sub-frames and so on. If shortDRX-Cycle is configured, the value of longDRX-Cycle shall be a multiple of the shortDRX-Cycle value. The value of drxStartOffset value is in number of sub-frames. In case longDRX-CycleStartOffset-v1130 is signalled, the UE shall ignore longDRX-CycleStartOffset (i.e. without suffix).
maxHARQ-Tx
Maximum number of transmissions for UL HARQ in TS 36.321 [1].
onDuration Timer
Timer for DRX in TS 36.321 [1]. Value in number of PDCCH sub-frames. Value psf1 corresponds to 1 PDCCH sub-frame, psf2 corresponds to 2 PDCCH sub-frames and so on.
periodicBSR-Timer
Timer for BSR reporting in TS 36.321 [1]. Value in number of sub-frames. Value sf10 corresponds to 10 sub-frames, sf20 corresponds to 20 sub-frames and so on.
periodicPHR-Timer
Timer for PHR reporting in TS 36.321 [1]. Value in number of sub-frames. Value sf10 corresponds to 10 subframes, sf20 corresponds to 20 subframes and so on.
prohibitPHR-Timer
Timer for PHR reporting in TS 36.321 [1]. Value in number of sub-frames. Value sf0 corresponds to 0 subframes, sf100 corresponds to 100 subframes and so on.
retxBSR-Timer
Timer for BSR reporting in TS 36.321 [1]. Value in number of sub-frames. Value sf640 corresponds to 640 sub-frames, sf1280 corresponds to 1280 sub-frames and so on.
sCellDeactivationTimer
SCell deactivation timer in TS 36.321 [1]. Value in number of radio frames. Value rf4 corresponds to 4 radio frames, value rf8 corresponds to 8 radio frames and so on. E-UTRAN only configures the field if the UE is configured with TABLE 9-continued Discontinuous Reception (DRX)

one or more SCells. If the field is absent, the UE shall delete any existing value for this field and assume the value to be set to infinity. The same value applies for each SCell (although the associated functionality is performed independently for each SCell).
shortDRX-Cycle
Short DRX cycle in TS 36.321 [1]. Value in number of sub-frames. Value sf2 corresponds to 2 sub-frames, sf5 corresponds to 5 subframes and so on. In case short DRX-Cycle-v1130 is signalled, the UE shall ignore shortDRX-Cycle (i.e. without suffix).
sr-ProhibitTimer
Timer for SR transmission on PUCCH in TS 36.321 [1]. Value in number of SR period(s). Value 0 means no timer for SR transmission on PUCCH is configured. Value 1 corresponds to one SR period, Value 2 corresponds to 2*SR periods and so on. SR period is defined in TS 36.213 [2, table 10.1.5-1].
stag-Id
Indicates the TAG of an SCell, see TS 36.321 [1]. If the field is not configured for an SCell (e.g. absent in MAC-MainConfigSCell), the SCell is part of the PTAG.
stag-ToAddModList, stag-ToReleaseList
Used to configure one or more STAGs. E-UTRAN ensures that a STAG contains at least one SCell with configured uplink. If, due to SCell release a reconfiguration would result in an 'empty' TAG, E-UTRAN includes release of the concerned TAG.
timeAlignmentTimerSTAG
Indicates the value of the time alignment timer for an STAG, see TS 36.321 [1].
ttiBundling
TRUE indicates that TTI bundling TS 36.321 [1] is enabled while FALSE indicates that TTI bundling is disabled. TTI bundling can be enabled for FDD and for TDD only for configurations 0, 1 and 6. For TDD, E-UTRAN does not simultaneously enable TTI bundling and semi-persistent scheduling in this release of specification. Furthermore, E-UTRAN does not simultaneously configure TTI bundling and SCells with configured uplink.

| Conditional presence | Explanation |
| --- | --- |
| DRX | The field is optionally present, need ON, if drx-Config is present. Otherwise the field is not present and the UE takes no action i.e. continues to use the existing value, if previously configured. |

Here, the DRX configurations of the individual UEs may be UE-specifically configured depending on presence or absence of downlink data (to be transmitted) for each UE. Further, Method #7 may be configured to be applied only in the case of the SRXCH_D2D RX UE. Further, Method #7 may be configured to be applied only when the RRC_CONNECTED UE (or RRC_IDLE UE) performs the DRX operation. Further, Method #7 may be configured to be applied only in a situation where the CA technique is applied (and/or the CA technique is not applied).

Example 7-1

The predefined or pre-signaled DRX operation related specific timers (e.g., onDurationTimer, drx-InactivityTimer, drx-RetransmissionTimer) may be configured not to be counted on INV_DL SF(s) configured based on at least a part (i.e., a part or all) of the proposed methods (Method #1, Method #2, Method #3, Method #4, Method #5) described above. Here, the corresponding INV_DL SF(s) may be interpreted as a sort of measurement gap (i.e., Table 9) in which specific timers related to the DRS operation have not been counted under the legacy operation or interpreted as not being a PDCCH-subframe (see Table 9).

Example 7-2

The predefined or pre-signaled DRX operation related specific timers (e.g., onDurationTimer, drx-InactivityTimer, drx-RetransmissionTimer) may be configured to be counted on INV_DL SF(s) configured based on at least a part (i.e., a part or all) of the proposed methods (Method #1, Method #2, Method #3, Method #4, Method #5) described above. Here, when this configuration is applied, the corresponding INV_DL SF(s) may be interpreted as SF(s) in which PDCCH monitoring is not actually performed, but specific timers related to the predefined or pre-signaled DRX operation are counted.

Example 7-3

In the case where the CA technique is applied and the case where the CA technique is not applied, the specific timers (e.g., onDurationTimer, drx-InactivityTimer, and drx-RetransmissionTimer) related to the predefined or pre-signaled DRX operation are counted when the carrier aggregation technique (CA) may be counted in different manners.

For example, for simplicity, suppose that two cells (e.g., [CELL#1]: DL CC#A, UL CC#A, [CELL#2]: DL CC#B, UL CC#B) are configured with a CA technique, and the D2D signal (e.g., (serving/neighbor) discovery signal) reception operation is configured/performed only in UL CC #A of CELL #1. In this situation, specific timers related to the predefined or pre-signaled DRX operation may be configured to be counted in the INV_DL SF(s) configured on the basis of at least a part (i.e., a part or all) of the methods described above. This is because only the WAN downlink signal reception operation cannot be performed on DL CC #A (paired with corresponding UL CC #A) due to the D2D signal reception operation in CELL #1 UL CC #A (see Table 3), but is still possible in CELL #2 DL CC #B, and the DRX operation is commonly applied/operated regardless of cell.

On the other hand, in another example, when the CA technique is not applied, specific timers related to a predefined or pre-signaled DRX operation may be configured not to be counted on INV_DL SF(s) configured based on at least a part (i.e., a part or all) of the methods described above. This is because there is no other cell in which the WAN downlink signal reception operation can be performed on the INV_DL SF(s) when the CA technique is not applied.

As another example, when the CA technique is applied, specific timers related to a predefined or pre-signaled DRX operation may be configured not to be counted on INV_DL SF(s) configured based on at least a part (i.e., a part or all) of the methods described above. On the other hand, when the CA technique is not applied, the specific timers related to the predefined or pre-signaled DRX operation may be configured to be counted on the INV_DL SF(s) configured based on at least a part (i.e., a part or all) of the methods described above.

Method #8

The above-described INV_DL SF(s) (or DL gap) may be configured according to at least a part (i.e., a part or all) of the rules described in at least one of Examples 8-1 to 8-3 given below.

An example of the legacy (UE) random access procedure is shown in Tables 10 and 11 below.

TABLE 10

6.1 Random access procedure [2]
Prior to initiation of the non-synchronized physical random access procedure, Layer 1 shall receive the following information from the higher layers:
1. Random access channel parameters (PRACH configuration and frequency position)
2. Parameters for determining the root sequences and their cyclic shifts in the preamble sequence set for the primary cell (index to logical root sequence table, cyclic shift ($N_{CS}$), and set type (unrestricted or restricted set))

6.1 Physical non-synchronized random access procedure
From the physical layer perspective, the L1 random access procedure encompasses the transmission of random access preamble and random access response. The remaining messages are scheduled for transmission by the higher layer on the shared data channel and are not considered part of the L1 random access procedure. A random access channel occupies 6 resource blocks in a subframe or set of consecutive subframes reserved for random access preamble transmissions. The eNodeB is not prohibited from scheduling data in the resource blocks reserved for random access channel preamble transmission.
The following steps are required for the L1 random access procedure:
1. Layer 1 procedure is triggered upon request of a preamble transmission by higher layers.
2. A preamble index, a target preamble received power (PREAMBLE_RECEIVED_TARGET_POWER), a corresponding RA-RNTI and a PRACH resource are indicated by higher layers as part of the request.
3. A preamble transmission power $P_{PRACH}$ is determined as
$P_{PRACH} = \min\{ P_{CMAX, c}(i),$ PREAMBLE_RECEIVED_TARGET_POWER + $PL_c \}$_[dBm], where $P_{CMAX, c}(i)$ is the configured UE transmit power defined in [4] for subframe i of serving cell c and $PL_c$ is the downlink pathless estimate calculated in the UE for serving cell c.
4. A preamble sequence is selected from the preamble sequence set using the preamble index.
5. A single preamble is transmitted using the selected preamble sequence with transmission power $P_{PRACH}$ on the indicated PRACH resource.
6. Detection of a PDCCH with the indicated RA-RNTI is attempted during a window controlled by higher layers (see [1], subclause 5.1.4). If detected, the corresponding DL-SCH transport block is passed to higher layers. The higher layers parse the transport block and indicate the 20-bit uplink grant to the physical layer, which is processed according to subclause 6.2.

6.1.1 Timing
For the L1 random access procedure, UE's uplink transmission timing after a random access preamble transmission is as follows.
a) If a PDCCH with associated RA-RNTI is detected in subframe n, and the corresponding DL-SCH transport block contains a response to the transmitted preamble sequence, the UE shall, according to the information in the response, transmit an UL-SCH transport block in the first subframe $n + k_1$, $k_1 \geq 6$, if the UL delay field in subclause 6.2 is set to zero where $n + k_1$ is the first available UL subframe for PUSCH transmission, where for TDD serving cell, the first UL subframe for PUSCH transmission is determined based on the UL/DL configuration (i.e., the parameter subframeAssignment) indicated by higher layers. The UE shall postpone the PUSCH transmission to the next available UL subframe after $n + k_1$ if the field is set to 1.
b) If a random access response is received in subframe n, and the corresponding DL-SCH transport block does not contain a response to the transmitted preamble sequence, the UE shall, if requested by higher layers, be ready to transmit a new preamble sequence no later than in subframe n + 5.
c) If no random access response is received in subframe n, where subframe n is the last subframe of the random access response window, the UE shall, if requested by higher layers, be ready to transmit a new preamble sequence no later than in subframe n + 4.

In case a random access procedure is initiated by a "PDCCH order" in subframe n, the UE shall, if requested by higher layers, transmit random access preamble in the first subframe $n + k_2$, $k_2 \geq 6$, where a PRACH resource is available.
If a UE is configured with multiple TAGs, and if the UE is configured with the carrier indicator field for a given serving cell, the UE shall use the carrier indicator field value from the detected "PDCCH order" to determine the serving cell for the corresponding random access preamble transmission.

6.2 Random Access Response Grant
The higher layers indicate the 20-bit UL Grant to the physical layer, as defined in 3GPP TS 36.321 [1].
This is referred to the Random Access Response Grant in the physical layer.
The content of these 20 bits starting with the MSB and ending with the LSB are as follows:
    Hopping flag - 1 bit
    Fixed size resource block assignment - 10 bits
    Truncated modulation and coding scheme - 4 bits TABLE 10-continued TPC command for scheduled PUSCH - 3 bits
UL delay - 1 bit
CSI request - 1 bit The UE shall use the single-antenna port uplink transmission scheme for the PUSCH
transmission corresponding to the Random Access Response Grant and the PUSCH
retransmission for the same transport block.
The UE shall perform PUSCH frequency hopping if the single bit frequency hopping
(FH) field in a corresponding Random Access Response Grant is set as 1 and the uplink
resource block assignment is type 0, otherwise no PUSCH frequency hopping is performed.
When the hopping flag is set, the UE shall perform PUSCH hopping as indicated via the
fixed size resource block assignment detailed below.
The fixed size resource block assignment field is interpreted as follows:
if $N_{RB}^{UL} \leq 44$
    Truncate the fixed size resource block assignment to its b least significant bits, where
    $b = \lceil \log_2(N_{RB}^{UL} \cdot (N_{RB}^{UL} + 1)/2) \rceil$, and interpret the truncated resource block assignment
    according to the rules for a regular DCI format 0
else
    Insert b most significant bits with value set to '0' after the $N_{UL\_hop}$ hopping bits in the fixed
    size resource block assignment, where the number of hopping bits $N_{UL\_hop}$ is zero when the
    hopping flag bit is not set to 1, and is defined in Table 8.4-1 when the hopping flag bit is
    set to 1, and $b = (\lceil \log_2(N_{RB}^{UL} \cdot (N_{RB}^{UL} + 1)/2) \rceil - 10)$, and interpret the expanded resource block
    assignment according to the rules for a regular DCI format 0
end if
The truncated modulation and coding scheme field is interpreted such that the modulation
and coding scheme corresponding to the Random Access Response grant is determined from
MCS indices 0 through 15 in Table 8.6.1-1.
    The TPC command $\delta_{msg2}$ shall be used for setting the power of the PUSCH, and is interpreted according to
Table 6.2-1.

Table 6.2-1: TPC Command $\delta_{msg2}$ for Scheduled PUSCH

| TPC Command | Value (in dB) |
|---|---|
| 0 | −6 |
| 1 | −4 |
| 2 | −2 |
| 3 | 0 |
| 4 | 2 |
| 5 | 4 |
| 6 | 6 |
| 7 | 8 |

In non-contention based random access procedure, the CSI request field is interpreted to
determine whether an aperiodic CQI, PMI, and RI report is included in the corresponding
PUSCH transmission according to subclause 7.2.1. In contention based random access
procedure, the CSI request field is reserved.
The UL delay applies for TDD, FDD and FDD-TDD and this field can be set to 0 or 1 to indicate whether the
delay of PUSCH is introduced as shown in subclause 6.1.1.

TABLE 11

5.1 Random Access procedure [1]
5.1.1 Random Access Procedure initialization
The Random Access procedure described in this subclause is initiated by a PDCCH order or
by the MAC sublayer itself. Random Access procedure on an SCell shall only be initiated by
a PDCCH order. If a UE receives a PDCCH transmission consistent with a PDCCH order [6]
masked with its C-RNTI, and for a specific Serving Cell, the UE shall initiate a Random
Access procedure on this Serving Cell. For Random Access on the PCell a PDCCH order or
RRC optionally indicate the ra-PreambleIndex and the ra-PRACH-MaskIndex; and for
Random Access on an SCell, the PDCCH order indicates the ra-PreambleIndex with a value
different from 000000 and the ra-PRACH-MaskIndex. For the pTAG preamble transmission
on PRACH and reception of a PDCCH order are only supported for PCell.
Before the procedure can be initiated, the following information for related Serving Cell is
assumed to be available [3]:
    the available set of PRACH resources for the transmission of the Random Access Preamble, prach-
    ConfigIndex.
    the groups of Random Access Preambles and the set of available Random Access Preambles in each
    group (PCell only):
    The preambles that are contained in Random Access Preambles group A and Random Access Preambles
    group B are calculated from the parameters numberOfRA-Preambles and sizeOfRA-PreamblesGroupA:
    If sizeOfRA-PreamblesGroupA is equal to numberOfRA-Preambles then there is no Random Access
    Preambles group B. The preambles in Random Access Preamble group A are the preambles 0 to
    sizeOfRA-PreamblesGroupA − 1 and, if it exists, the preambles in Random Access Preamble group B are
    the preambles sizeOfRA-PreamblesGroupA to numberOfRA-Preambles − 1 from the set of 64 preambles
    as defined in [5].
    if Random Access Preambles group B exists, the thresholds, messagePowerOffsetGroupB and
    messageSizeGroupA, the configured UE transmitted power of the Serving Cell performing the Random

TABLE 11-continued

Access Procedure, $P_{CMAX, c}$ [4], and the offset between the preamble and Msg3, deltaPreambleMsg3, that are required for selecting one of the two groups of Random Access Preambles (PCell only).
the RA response window size ra-ResponseWindowSize.
the power-ramping factor powerRampingStep.
the maximum number of preamble transmission preambleTransMax.
the initial preamble power preambleInitialReceivedTargetPower.
the preamble format based offset DELTA PREAMBLE (see subclause 7.6).
the maximum number of Msg3 HARQ transmissions maxHARQ-Msg3Tx (PCell only).
the Contention Resolution Timer mac-ContentionResolutionTimer (PCell only).

NOTE: The above parameters may be updated from upper layers before each Random Access procedure is initiated.

The Random Access procedure shall be performed as follows:
Flush the Msg3 buffer;
set the PREAMBLE_TRANSMISSION_COUNTER to 1;
set the backoff parameter value in the UE to 0 ms;
for the RN, suspend any RN subframe configuration;
proceed to the selection of the Random Access Resource (see subclause 5.1.2).

NOTE: There is only one Random Access procedure ongoing at any point in time. If the UE receives a request for a new Random Access procedure while another is already ongoing, it is up to UE implementation whether to continue with the ongoing procedure or start with the new procedure.

5.1.2 Random Access Resource selection
The Random Access Resource selection procedure shall be performed as follows:
If ra-PreambleIndex (Random Access Preamble) and ra-PRACH-MaskIndex (PRACH Mask Index) have been explicitly signalled and ra-PreambleIndex is not 000000:
the Random Access Preamble and the PRACH Mask Index are those explicitly signalled.
else the Random Access Preamble shall be selected by the UE as follows:
If Msg3 has not yet been transmitted, the UE shall:
if Random Access Preambles group B exists and if the potential message size (data available for transmission plus MAC header and, where required, MAC control elements) is greater than messageSizeGroupA and if the pathloss is less than $P_{CMAX, c}$ (of the Serving Cell performing the Random Access Procedure) – preambleInitialReceivedTargetPower – deltaPreambleMsg3 – messagePowerOffsetGroupB, then:
select the Random Access Preambles group B;
else:
select the Random Access Preambles group A.
else, if Msg3 is being retransmitted, the UE shall:
select the same group of Random Access Preambles as was used for the preamble transmission attempt corresponding to the first transmission of Msg3.
randomly select a Random Access Preamble within the selected group. The random function shall be such that each of the allowed selections can be chosen with equal probability;
set PRACH Mask Index to 0.
determine the next available subframe containing PRACH permitted by the restrictions given by the prach-ConfigIndex, the PRACH Mask Index (see subclause 7.3) and physical layer timing requirements [2] (a UE may take into account the possible occurrence of measurement gaps when determining the next available PRACH subframe);
if the transmission mode is TDD and the PRACH Mask Index is equal to zero:
if ra-PreambleIndex was explicitly signalled and it was not 000000 (i.e., not selected by MAC):
randomly select, with equal probability, one PRACH from the PRACHs available in the determined subframe.
else:
randomly select, with equal probability, one PRACH from the PRACHs available in the determined subframe and the next two consecutive subframes.
else:
determine a PRACH within the determined subframe in accordance with the requirements of the PRACH Mask Index.
proceed to the transmission of the Random Access Preamble (see subclause 5.1.3).

5.1.3 Random Access Preamble transmission
The random-access procedure shall be performed as follows:
set PREAMBLE_RECEIVED_TARGET_POWER to preambleInitialReceivedTargetPower + DELTA_PREAMBLE + (PREAMBLE_TRANSMISSION_COUNTER – 1) * powerRampmgStep;
instruct the physical layer to transmit a preamble using the selected PRACH, corresponding RA-RNTI, preamble index and PREAMBLE_RECEIVED_TARGET_POWER.

5.1.4 Random Access Response reception
Once the Random Access Preamble is transmitted and regardless of the possible occurrence of a measurement gap, the UE shall monitor the PDCCH of the PCell for Random Access Response(s) identified by the RA-RNTI defined below, in the RA Response window which starts at the subframe that contains the end of the preamble transmission [5] plus three subframes and has length ra-ResponseWindowSize subframes. The RA-RNTI associated with the PRACH in which the Random Access Preamble is transmitted, is computed as:

$$\text{RA-RNTI}= 1 + t\_id + 10*f\_id$$

Where t_id is the index of the first subframe of the specified PRACH ($0 \leq t\_id < 10$), and f_id is the index of the specified PRACH within that subframe, in ascending order of frequency domain ($0 \leq f\_id < 6$). The UE may stop monitoring for Random Access Response(s) after successful reception of a Random Access Response containing Random Access Preamble identifiers that matches the transmitted Random Access Preamble.
If a downlink assignment for this TTI has been received on the PDCCH for the RA-RNTI and the received TB is successfully decoded, the UE shall regardless of the possible occurrence of a measurement gap:

TABLE 11-continued if the Random Access Response contains a Backoff Indicator subheader:
        set the backoff parameter value in the UE as indicated by the BI field of the Backoff Indicator
        subheader and Table 7.2-1.
    else, set the backoff parameter value in the UE to 0 ms.
    if the Random Access Response contains a Random Access Preamble identifier corresponding to the
    transmitted Random Access Preamble (see subclause 5.1.3), the UE shall:
        consider this Random Access Response reception successful and apply the following actions for
        the serving cell where the Random Access Preamble was transmitted:
            process the received Timing Advance Command (see subclause 5.2);
            indicate the preambleInitialReceivedTargetPower and the amount of power ramping applied
            to the latest preamble transmission to lower layers (i.e.,
            (PREAMBLE_TRANSMISSION_COUNTER − 1) * powerRampmgStep);
            process the received UL grant value and indicate it to the lower layers;
        if ra-PreambleIndex was explicitly signalled and it was not 000000 (i.e., not selected by MAC):
            consider the Random Access procedure successfully completed.
        else, if the Random Access Preamble was selected by UE MAC:
            set the Temporary C-RNTI to the value received in the Random Access Response message no
            later than at the time of the first transmission corresponding to the UL grant provided in the
            Random Access Response message;
            if this is the first successfully received Random Access Response within this Random Access
            procedure:
                if the transmission is not being made for the CCCH logical channel, indicate to the
                Multiplexing and assembly entity to include a C-RNTI MAC control element in the
                subsequent uplink transmission;
                obtain the MAC PDU to transmit from the "Multiplexing and assembly" entity and store it
                in the Msg3 buffer.
NOTE:   When an uplink transmission is required, e.g., for contention resolution, the eNB should not
           provide a grant smaller than 56 bits in the Random Access Response.
NOTE:   If within a Random Access procedure, an uplink grant provided in the Random Access Response
           for the same group of Random Access Preambles has a different size than the first uplink grant
           allocated during that Random Access procedure, the UE behavior is not defined.
If no Random Access Response is received within the RA Response window, or if none of all
received Random Access Responses contains a Random Access Preamble identifier
corresponding to the transmitted Random Access Preamble, the Random Access Response
reception is considered not successful and the UE shall:
    increment PREAMBLE_TRANSMISSION_COUNTER by 1;
    If PREAMBLE_TRANSMISSION_COUNTER = preambleTransMax + 1:
        if the Random Access Preamble is transmitted on the PCell:
            indicate a Random Access problem to upper layers;
        if the Random Access Preamble is transmitted on an SCell:
            consider the Random Access procedure unsuccessfully completed.
    if in this Random Access procedure, the Random Access Preamble was selected by MAC:
        based on the backoff parameter in the UE, select a random backoff time according to a uniform
        distribution between 0 and the Backoff Parameter Value;
        delay the subsequent Random Access transmission by the backoff time;
    proceed to the selection of a Random Access Resource (see subclause 5.1.2).
5.1.5 Contention Resolution
Contention Resolution is based on either C-RNTI on PDCCH of the PCell or UE Contention
Resolution Identity on DL-SCH.
Once Msg3 is transmitted, the UE shall:
    start mac-ContentionResolutionTimer and restart mac-ContentionResolutionTimer at each HARQ
    retransmission;
    regardless of the possible occurrence of a measurement gap, monitor the PDCCH until mac-
    ContentionResolutionTimer expires or is stopped;
    if notification of a reception of a PDCCH transmission is received from lower layers, the UE shall:
        if the C-RNTI MAC control element was included in Msg3:
            if the Random Access procedure was initiated by the MAC sublayer itself and the PDCCH
            transmission is addressed to the C-RNTI and contains an UL grant for a new transmission; or
            if the Random Access procedure was initiated by a PDCCH order and the PDCCH transmission is
            addressed to the C-RNTI:
                consider this Contention Resolution successful;
                stop mac-ContentionResolutionTimer,
                discard the Temporary C-RNTI;
                consider this Random Access procedure successfully completed.
        else if the CCCH SDU was included in Msg3 and the PDCCH transmission is addressed to its
        Temporary C-RNTI:
            if the MAC PDU is successfully decoded:
                stop mac-ContentionResolutionTimer;
                if the MAC PDU contains a UE Contention Resolution Identity MAC control element; and
                if the UE Contention Resolution Identity included in the MAC control element matches the
                CCCH SDU transmitted in Msg3:
                      consider this Contention Resolution successful and finish the disassembly and
                      demultiplexing of the MAC PDU;
                      set the C-RNTI to the value of the Temporary C-RNTI;
                      discard the Temporary C-RNTI;
                      consider this Random Access procedure successfully completed.
                else
                    discard the Temporary C-RNTI;
                    consider this Contention Resolution not successful and discard the successfully decoded
                    MAC PDU.

TABLE 11-continued

```
    if mac-ContentionResolutionTimer expires:
        discard the Temporary C-RNTI;
        consider the Contention Resolution not successful.
    if the Contention Resolution is considered not successful the UE shall:
        flush the HARQ buffer used for transmission of the MAC PDU in the Msg3 buffer;
        increment PREAMBLE_TRANSMISSION_COUNTER by 1;
        If PREAMBLE_TRANSMISSION_COUNTER = preambleTransMax + 1:
            indicate a Random Access problem to upper layers.
        based on the backoff parameter in the UE, select a random backoff time according to a uniform
        distribution between 0 and the Backoff Parameter Value;
        delay the subsequent Random Access transmission by the backoff time;
        proceed to the selection of a Random Access Resource (see subclause 5.1.2).
5.1.6 Completion of the Random Access procedure
At completion of the Random Access procedure, the UE shall:
        discard explicitly signalled ra-PreambleIndex and ra-PRACH-MaskIndex, if any;
        flush the HARQ buffer used for transmission of the MAC PDU in the Msg3 buffer.
In addition, the RN shall resume the suspended RN subframe configuration, if any.
```

The Method #8 may be configured to be applied only in the case of the SRXCH_D2D RX UE. In addition, Method #8 may be configured to be applied only when the RC_CONNECTED UE (or RRC_IDLE UE) performs the random access procedure. Method #8 may also be configured to be applied only when the CA technique is applied (and/or the CA technique is not applied). Also, Method #8 may be configured to be applied only in the contention-based random access procedure (and/or contention free-based random access procedure).

Hereinafter, for simplicity, the INV_DL SF(s) set (or DL gap set) related to a discovery pool configured base on at least a part (a part or all) of the above-described proposed methods (e.g., Method #1, Method #2, Method #3, Method #4, Method #5, Method #6) (and/or a INV_DL SF(s) set (or DL gap set) related to D2DSS (associated with the discovery pool)) will be referred to as "INV_DL SF(s)_DISWIN" (and/or "INV_DL SF(s)_DSSWIN"). Also, for example, Method #8 may be configured to be applied only in the case of "INV_DL SF(s)_DISWIN" (and/or "INV_DL SF(s)_DSSWIN").

Example 8-1

If the INV_DL SF(s)_DISWIN (and/or INV_DL SF(s)_DSSWIN) at least partially (i.e., partially or fully) overlap the random access response window (see Table 11) described above, the D2D UE may be defined not to configure INV_DL SF(s)_DISWIN (and/or INV_DL SF(s)_DSSWIN) related to the corresponding discovery pool (and/or D2DSS associated with the discovery pool) (i.e., the D2D UE may not perform the D2DSS reception operation associated with the corresponding discovery signal and/or discovery pool).

Here, application of this configuration/rule may be interpreted as meaning that reception of a random access response (or the random access procedure) is prioritized over reception of a discovery signal (and/or D2DSS associated with the discovery pool).

Example 8-2

If the INV_DL SF(s)_DISWIN (and/or INV_DL SF(s)_DSSWIN) at least partially (i.e., partially or fully) overlaps the random access response window (see Table 11) described above, the D2D UE may be configured to perform reception of a random access response in a region from the starting SF of the random access response window to the ending SF of the random access response window (i.e., not to receive D2DSS associated with the corresponding discovery signal and/or discovery pool) and configured not to perform reception of the D2DSS association with the corresponding discovery signal and/or discovery pool in the SF(s) after the ending SF of the random access response window (i.e., configured to receive a WAN downlink signal).

Here, for example, when this rule is applied, if there is a (reception) resource related to the discovery pool (and/or the D2DSS associated with the discovery pool) even before the starting SF of the random access response window, the UE may be configured not to receive D2DSS associated with the discovery signal and/or the discovery pool on a resource at least partially (i.e., partially or fully) overlapping the starting SF-1 of the random access response window (i.e., SF(s) for ensuring a time necessary for carrier (or frequency band) switching operation of a single RX chain). For example, if even the previous SF(s) of the SF at least partially (i.e., partially or fully) overlapping the first SF-1 of the random access response window is a (reception) resource related to the discovery pool and/or D2DSS associated with the discovery pool, the UE may be configured to receive the discovery signal and/or D2DSS associated with the discovery pool in the previous SF(s).

Example 8-3

If the INV_DL SF(s)_DISWIN (and/or INV_DL SF(s)_DSSWIN) at least partially (i.e., partially or fully) overlaps the random access response window (see Table 11) described above, the D2D UE may be configured not to receive the discovery signal and/or D2DSS associated with the discovery pool only in SF(s) at least partially (i.e., partially or fully) overlapping the region from the starting SF-1 of the random access response window to the ending SF+1 of the random access response window.

Example 8-4

If INV_DL SF(s)_DISWIN (and/or INV_DL SF(s)_DSSWIN) overlaps SF(s) (set) (hereinafter "WAN_WIN") for at least some (i.e., some or all) uses described below, the D2D UE may not configure INV_DL SF(s)_DISWIN (and/or INV_DL SF(s)_DSSWIN) (related to the corresponding discovery pool and/or D2DSS associated with the corresponding discovery pool).

In another example, if the INV_DL SF(s)_DISWIN (and/or INV_DL SF(s)_DSSWIN) at least partially (i.e., partially or fully) overlaps WAN_WIN described above, the D2D UE may be configured to perform a WAN_WIN related reception operation (i.e., not to receive the corresponding the corresponding discovery signal and/or corresponding D2DSS associated with the discovery pool) in the region from the starting SF to the ending SF of WAN_WIN, and configured not to receive the corresponding discovery signal and/or D2DSS association with the discovery signal (i.e., configured to receive a WAN downlink signal) in SF(s) following the ending SF of WAN_WIN.

When this configuration/rule is applied, if there is a (reception) resource related to the discovery pool and/or the D2DSS associated with the discovery pool even before the starting SF of WAN_WIN, the UE may be configured not to receive the discovery signal and/or the D2DSS associated with the discovery pool on a resource at least partially (i.e., partially or fully) overlapping the starting SF of WAN_WIN−1 (i.e., SF(s) for ensuring a time necessary for carrier (or frequency band) switching operation of a single RX chain). For example, if the previous SF(s) before the SF at least partially (i.e., partially or fully) overlapping the starting SF of WAN_WIN−1 are also configured as (reception) resources related to the discovery pool and/or D2DSS associated with the discovery pool, the UE may be configured to receive the discovery signal and/or D2DSS associated with the discovery pool in the previous SF(s).

if the INV_DL SF(s)_DISWIN (and/or INV_DL SF(s)_DSSWIN) at least partially (i.e., partially or fully) overlaps WAN_WIN described above, the D2D UE may be configured not to receive the corresponding discovery signal and/or the D2DSS associated with the discovery pool only on the SF(s) at least partially (i.e., partially or fully) overlapping the region from the starting SF of the WAN_WIN−1 to the ending SF of the WAN_WIN+1.

Random Access Response Window

MESSAGE 3 (e.g., PUSCH) (re)transmission time (in the contention-based random access procedure)

PHICH reception time related to MESSAGE 3 (e.g., PUSCH) (re)transmission time (in the contention-based random access procedure)

MESSAGE 4 (i.e., Contention Resolution Message) (in the contention-based random access procedure)

Random access preamble (re)transmission time

It is apparent that examples of the proposed methods as proposed methods as they can be included in one of the methods for implementing the present invention. The proposed methods may be implemented independently or in a combination thereof.

The proposed methods described above may be configured to be applied only in the FDD system and/or the TDD system environment.

The proposed methods described above may be configured to be applied only to MODE 2 communication and/or TYPE 1 discovery (and/or MODE 1 communication and/or TYPE 2 discovery).

The proposed methods described above may be configured to be applied only when the D2D RX UE receives neighbor cell related synchronization error information of w1 related to reception of an inter-cell discovery signal (and/or neighbor cell discovery signal).

In addition the proposed methods described above may be configured to be applied only to at least one of the in-coverage D2D UE, the out-coverage D2D UE, the RRC_CONNECTED D2D UE, and the RRC_IDLE D2D UE.

Furthermore, the above-described proposed methods may be configured to be applied only to the D2D UE only the D2D discovery (transmission/reception) operation (and/or the D2D UE performing only the D2D communication (transmission/reception) operation).

Furthermore, the proposed methods described above may be configured to be applied only to a scenario in which only D2D discovery is supported/configured (and/or a scenario in which only D2D communication is supported/configured).

Further, in the proposed methods described above, the CEILING(X) function (i.e., a function that derives the minimum integer greater than or equal to X) may be replaced by the FLOOR(X) (i.e., a function that derives the maximum integer less than or equal to X).

Further, the proposed methods described above may be configured to be applied only to the SHRXCH_D2D RX UE (and/or SRXCH_D2D RX UE).

Furthermore, the proposed methods described above may be configured to be applied only when CA is applied or when CA is not applied.

Further, the proposed methods described above may be configured to be used only in a case where D2D discovery signal reception is performed on a different (UL) carrier at an inter-frequency and/or in a case D2D discovery signal reception is performed on a different inter-PLMN-based PLMN (UL) carrier.

Figure 15:
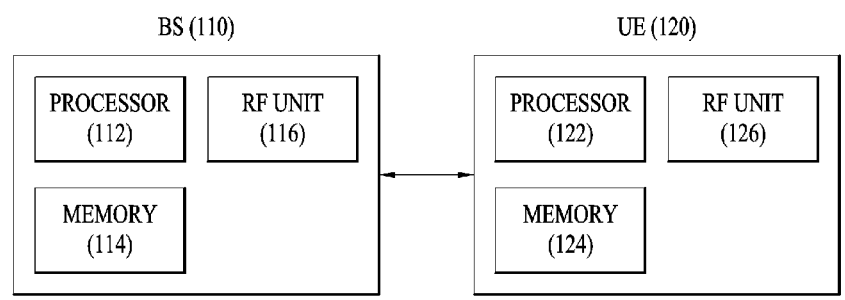
FIG. 15 shows a base station and a terminal that may be applied to an embodiment of the present invention.

FIG. 15 illustrates a BS and a UE that may be applied to an embodiment of the present invention.

When a relay is included in a wireless communication system, communication on the backhaul link is performed between the BS and the relay, and communication on the access link is performed between the relay and the UE. Therefore, the eNB or the UE illustrated in the figure may be replaced with a relay in a situation.

Referring to FIG. 15, a wireless communication system includes a BS 110 and a UE 120. The BS 110 includes a processor 112, a memory 114 and a radio frequency (RF) unit 116. The processor 112 may be configured to implement the procedures and/or methods proposed in the present invention. The memory 114 is connected to the processor 112 and stores various kinds information related to operation of the processor 112. The RF unit 116 is connected to the processor 112, and transmits and/or receives a radio signal. The UE 120 includes a processor 122, a memory 124 and an RF unit 126. The processor 122 may be configured to implement the procedures and/or methods proposed in the present invention. The memory 124 is connected to the processor 122 and stores various kinds information related to operation of the processor 122. The RF unit 126 is connected to the processor 122, and transmits and/or receives a radio signal. The BS 110 and/or the UE 120 may have a single antenna or multiple antennas.

The embodiments described above are constructed by combining elements and features of the present invention in a predetermined form. Each element or feature should be understood as optional unless explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in another embodiment, or may be replaced by corresponding elements or features of another embodiment. Claims that are not explicitly cited in each other in the appended claims may be combined to establish an embodiment of the present invention or be included in a new claim by subsequent amendment after the application is filed.

A specific operation which has been described as being performed by the BS may be performed by an upper node of the BS. In other words, it will be apparent that various operations performed for communication with the user equipment UE in the network which includes a plurality of network nodes along with the base station may be performed by the base station BS or network nodes other than the base station BS. Here, the term BS may be replaced with terms such as a fixed station, Node B, eNode B (eNB), and an access point (AP).

Embodiments of the present invention may be implemented by various means such as, for example, hardware, firmware, software, or combinations thereof. When practiced in hardware, one embodiment of the present invention may be implemented by one or more ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors, and the like.

When practiced in firmware or software, an embodiment of the present invention may be implemented in the form of a module, a procedure, a function, or the like which performs the functions or operations described above. Software code may be stored in the memory unit and executed by the processor.

The memory unit may be disposed inside or outside the processor to transceive data with the processor via various well-known means.

The present invention may be carried out in other specific ways than those set forth herein without departing from the characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein.

INDUSTRIAL APPLICABILITY

A method for transmitting and receiving a D2D signal in a wireless communication system and a apparatus therefor have been described above, focusing on a case where the present invention is applied to a 3GPP LTE system. The present invention is also applicable to various wireless communication systems other than the 3GPP LTE system.

What is claimed is:

1. A method for monitoring a downlink control channel by a first user equipment (UE) having a single reception (RX) chain in a wireless communication system, the method comprising:
configuring a resource region related to transmission and reception of a Device-to-Device (D2D) signal as a gap; and
monitoring a Wide Area Network (WAN) communication-based downlink control channel based on a timer operated according to a discontinuous reception (DRX) operation,
wherein the timer is counted based on at least one subframe not included in the resource region configured as the gap,
wherein the gap is a time interval configured for switching between WAN communication and D2D communication.

2. The method according to claim 1, wherein, when the first UE supports carrier aggregation (CA) and WAN communication is enabled in at least one of a first cell or a second cell for the CA, the timer is configured to be counted including the resource region configured as the gap.

3. A first user equipment (UE) for monitoring a downlink control channel having a single reception (RX) chain in a wireless communication system, the UE comprising:
a radio frequency (RF) unit; and
a processor,
wherein the processor is configured to:
configure a resource region related to transmission and reception of a Device-to-Device (D2D) signal as a gap; and
monitor a Wide Area Network (WAN) communication-based downlink control channel based on a timer operated according to a discontinuous reception (DRX) operation,
wherein the timer is counted based on at least one subframe not included in the resource region configured as the gap,
wherein the gap is a time interval configured for switching between WAN communication and D2D communication.

4. A method for performing a random access procedure by a first user equipment (UE) having a single reception (RX) chain in a wireless communication system, the method comprising:
configuring a random access response (RAR) window for performing a Wide region Network (WAN) based random access procedure; and
configuring a resource region related to transmission and reception of a Device-to-Device (D2D) signal and a gap for the resource region,
wherein the gap is a time interval configured for switching between WAN communication and D2D communication,
wherein the resource region and the gap are configured only when the RAR window does not overlap the resource region and the specific gap.

* * * * *